US012534143B2

(12) United States Patent
Wu et al.

(10) Patent No.: US 12,534,143 B2
(45) Date of Patent: Jan. 27, 2026

(54) ROBOT FOR CLIMBING AND/OR MOVING ALONG SURFACES

(71) Applicant: wwRobots Canada Ltd., Winnipeg (CA)

(72) Inventors: Wei Wu, Winnipeg (CA); Kai Wu, Hangzhou (CN)

(73) Assignee: wwRobots Canada Ltd., Winnipeg (CA)

( * ) Notice: Subject to any disclaimer, the term of this patent is extended or adjusted under 35 U.S.C. 154(b) by 422 days.

(21) Appl. No.: 18/136,058

(22) Filed: Apr. 18, 2023

(65) Prior Publication Data

US 2024/0326936 A1    Oct. 3, 2024

(30) Foreign Application Priority Data

Mar. 30, 2023    (CN) .......................... 202310331234.3

(51) Int. Cl.
*B62D 57/02*    (2006.01)
*B25J 9/10*    (2006.01)
(Continued)

(52) U.S. Cl.
CPC ............ *B62D 57/032* (2013.01); *B25J 9/144* (2013.01); *B25J 9/20* (2013.01); *B25J 15/0608* (2013.01);
(Continued)

(58) Field of Classification Search
CPC .... B62D 57/02; B62D 57/022; B62D 57/024; B62D 57/032; B25J 9/144; B25J 9/146; B25J 9/1623; B25J 9/1694; B25J 9/20; B25J 15/0608; B25J 15/0616; B25J 19/005; B25J 19/06
See application file for complete search history.

(56) References Cited

U.S. PATENT DOCUMENTS 4,321,976 A * 3/1982 Reinke ................... B62D 57/00
180/8.5
4,674,949 A    6/1987 Kroczynski
(Continued)

FOREIGN PATENT DOCUMENTS

CN    202681848 U    1/2013
CN    104590418 A    5/2015
(Continued)

*Primary Examiner* — Adam D Rogers
(74) *Attorney, Agent, or Firm* — SMART & BIGGAR LP; Tonino Rosario Orsi

(57) ABSTRACT

Various implementations of a robot are described which generally includes: a frame having first and second frame ends, the frame extending longitudinally between the first and second frame ends; a track having first and second track ends, the track being suspended below the frame and extending longitudinally between the first and second track ends, the first track end being positioned proximate to the first frame end and the second track end being positioned proximate the second frame end; a carrier drivingly coupled to the track, the carrier being translatable along the track between the first and second track ends; and at least one first foot mounted to the first frame end, at least one second foot mounted to the second frame end, and at least one third foot being rotatably mounted to the carrier so that the at least one third foot is rotatable relative to the track.

21 Claims, 15 Drawing Sheets

(51) Int. Cl.
  *B25J 9/14*     (2006.01)
  *B25J 9/16*     (2006.01)
  *B25J 9/20*     (2006.01)
  *B25J 15/06*    (2006.01)
  *B62D 57/024*   (2006.01)
  *B62D 57/032*   (2006.01)

(52) U.S. Cl.
  CPC ........ *B25J 15/0616* (2013.01); *B62D 57/024* (2013.01)

(56) References Cited

U.S. PATENT DOCUMENTS

| | | | |
|---|---|---|---|
| 4,790,400 A | | 12/1988 | Sheeter |
| 4,940,382 A | | 7/1990 | Castelain et al. |
| 5,351,626 A | | 10/1994 | Yanagisawa |
| 5,351,773 A | * | 10/1994 | Yanagisawa ......... B62D 57/032 180/8.5 |
| 5,429,009 A | | 7/1995 | Wolfe et al. |
| 5,551,525 A | * | 9/1996 | Pack ................... B62D 57/032 180/8.1 |
| 5,839,532 A | * | 11/1998 | Yoshiji .................. B62D 57/00 180/164 |
| 5,890,553 A | | 4/1999 | Bar-Cohen et al. |
| 6,843,328 B2 | * | 1/2005 | Boyl-Davis ......... B23Q 9/0007 173/32 |
| 8,019,472 B2 | | 9/2011 | Montero Sanjuan et al. |
| 11,959,463 B2 | * | 4/2024 | Cieslak ................... B23P 6/002 |
| 2004/0131462 A1 | | 7/2004 | Hawkins et al. |
| 2018/0148114 A1 | * | 5/2018 | Niederberger ....... B62D 57/032 |
| 2021/0095642 A1 | | 4/2021 | Cieslak |

FOREIGN PATENT DOCUMENTS

| | | | | |
|---|---|---|---|---|
| CN | 104670356 A | | 6/2015 | |
| CN | 104704575 A | | 6/2015 | |
| CN | 106240668 A | | 12/2016 | |
| CN | 104816761 B | | 1/2017 | |
| CN | 106809296 A | | 6/2017 | |
| CN | 107097122 A | * | 8/2017 | ........... B62D 57/032 |
| CN | 107363296 A | * | 11/2017 | ........... B62D 57/024 |
| CN | 107685785 A | | 2/2018 | |
| CN | 109176468 A | * | 1/2019 | ................ B25J 9/00 |
| CN | 208799151 U | | 4/2019 | |
| CN | 109229227 B | | 10/2019 | |
| CN | 110641570 A | * | 1/2020 | ........... B62D 57/024 |
| CN | 112719865 A | * | 4/2021 | ........... B62D 57/024 |
| CN | 110772186 B | | 6/2021 | |
| CN | 112932318 A | * | 6/2021 | ........... A47L 11/4002 |
| CN | 110510025 B | | 9/2021 | |
| CN | 112896354 B | | 4/2022 | |
| CN | 107839777 B | * | 8/2024 | ........... G05D 1/0094 |
| JP | 03104785 | | 5/1991 | |
| WO | 2010142044 A1 | | 12/2010 | |
| WO | 2022053821 A1 | | 3/2022 | |

\* cited by examiner

ROBOT FOR CLIMBING AND/OR MOVING ALONG SURFACES

FIELD

The present disclosure relates generally to robots, and more specifically, to pneumatically controlled robots that may climb and/or move along surfaces.

INTRODUCTION

The following paragraphs are provided by way of background to the present disclosure. They are not, however, an admission that anything discussed therein is prior art or part of the knowledge of persons skilled in the art.

Robots are increasingly being used for defect inspection and repair in various industries where there is a safety risk for technicians or maintenance personnel. In this regard, robots may demonstrate more efficiency depending on how they are implemented. Typically, robots are equipped with a locomotive mechanism, actuators such as mechanical arms, cameras and functional software modules for performing various tasks. Since robots can perform these tasks more efficiently, this can result in faster inspection time which translates to reduced downtime. Also, robots may provide better data analysis that enables high precision and predictive maintenance which results in lower maintenance costs.

For example, in the wind energy market, climbing robots may be used to climb turbines and turbine blades for inspection and maintenance. Wind turbine blades are the most expensive component of a wind turbine and have a direct impact on the energy produced by the wind turbine. However, wind turbine blades face extreme loads and changing weather conditions making inspection and repair by human workers that are physically on the wind turbine challenging and dangerous.

However, known climbing robots have been found to have certain limitations in that the construction thereof results in a robot that is too heavy and clumsy to perform specific tasks. Further, it has been found that the smaller and/or lighter climbing robots known in the art are not robust/strong enough to complete specific tasks.

SUMMARY

This section is provided to introduce the reader to the more detailed discussion to follow. This section is not intended to limit or define any claimed or as yet unclaimed subject matter. One or more items of claimed subject matter may reside in any combination or sub-combination of the elements or process steps disclosed in any part of this document including its claims and figures.

In accordance with one aspect of this disclosure, there is provided a robot including: a frame having first and second frame ends, the frame extending longitudinally between the first and second frame ends; a track having first and second track ends, the track being suspended below the frame and extending longitudinally between the first and second track ends, the first track end being positioned proximate to the first frame end and the second track end being positioned proximate the second frame end; a carrier drivingly coupled to the track, the carrier being translatable along the track between the first and second track ends; and at least one first foot mounted to the first frame end, at least one second foot mounted to the second frame end, and at least one third foot being rotatably mounted to the carrier so that the at least one third foot is rotatable relative to the track. At least one of the at least one first foot, the at least one second foot, and the at least one third foot is linearly displaceable so that the at least one third foot is positionable between first and second positions. In the first position, the at least one third foot is positioned closer to the frame compared to the at least one first foot and the at least one second foot. In the second position, the at least one third foot is positioned farther away from the frame compared the at least one first foot and the at least one second foot.

In at least one embodiment, the robot may further include at least one support link extending between the carrier and the frame, each support link of the at least one support link may be rigidly coupled to the carrier and may be translatable along the frame.

In at least one embodiment, the track may include a first rod of a double rod piston cylinder and a second rod of the double rod piston cylinder and the carrier may be a cylinder of the double rod piston cylinder.

In at least one embodiment, the double rod piston cylinder may be configured to receive a first flow of pressurized gas in a controlled manner that causes the rods of the double rod piston cylinder to move and cause linear translation of the robot.

In at least one embodiment, each of the at least one first foot, the at least one second foot, and the at least one third foot may include a respective single rod piston cylinder for linearly displacing a corresponding foot.

In at least one embodiment, a given single rod piston cylinder may be configured to receive a second flow of pressurized gas in a controlled manner for linearly displacing a corresponding foot of the at least one first foot, the at least one second foot, and the at least one third foot.

In at least one embodiment, the at least one third foot may be rotatably mounted to the carrier by a rotation cylinder.

In at least one embodiment, the rotation cylinder may be configured to receive a third flow of pressurized gas in a controlled manner that causes the rotation cylinder to rotate.

In at least one embodiment, each of the at least one first foot, the at least one second foot, and the at least one third foot may include a respective suction cup that is pneumatically coupled to a respective vacuum generator for controlling a gripping force of the respective suction cup.

In at least one embodiment, each of the respective vacuum generators may be configured to receive a fourth flow of pressurized gas in a controlled manner to provide a suction force to the respective suction cup or remove the suction force from the respective suction cup.

In at least one embodiment, the robot may further include a pneumatic loop having a pressurized gas junction and gas pressure circuits that are fluidically coupled to one another, the pressurized gas junction may have an inlet for receiving pressurized gas from a pressurized gas supply and at least one pressurized gas outlet that may be coupled to one of the gas pressure circuits and the gas pressure circuits may be configured to provide one or more pressurized gas flows.

In at least one embodiment, the pneumatic loop may include solenoid valves for each gas pressure circuit, the solenoid valves may be controlled to allow or remove the flow of pressurized gas in the gas pressure circuits In at least one embodiment, the robot may further include a controller for controlling motion and functionality of the robot.

In at least one embodiment, the vacuum system may further include a gas pressure meter that may be configured to measure gas pressure in the pneumatic loop, compare the measured gas pressure with a minimum pressure threshold value and generate a low pressure signal when the measured gas pressure is less than the minimum pressure threshold value.

In at least one embodiment, the controller may be configured to prevent the robot from performing an action that will consume gas pressure when the low pressure signal is generated.

In at least one embodiment, the robot may be coupled to a gas pressure pump and the controller may be configured to send a gas supply command signal to the gas pressure pump so that further gas may be provided to the pneumatic loop of the robot from the gas pressure pump.

In at least one embodiment, the robot may further include a battery.

In at least one embodiment, the robot may further include a battery voltage meter that may be configured to measure battery voltage of the battery and to generate a low battery signal when the measured battery voltage is less than a battery voltage threshold value.

In at least one embodiment, the controller may be configured to send a recharging signal to a remote operator for recharging the battery when the low battery signal is generated.

In at least one embodiment, each of the at least one first foot, the at least one second foot, and the at least one third foot may include a respective electromagnet.

In at least one embodiment, the robot may further include at least one pneumatically actuatable clips for releasably securing the robot to a drone.

These and other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

DRAWINGS

For a better understanding of the various embodiments described herein, and to show more clearly how these various embodiments may be carried into effect, reference will be made, by way of example, to the accompanying drawings which show at least one example embodiment of apparatuses of the present teachings, and which are now described. The drawings are not intended to limit the scope of the teachings described herein.

Figure 1:
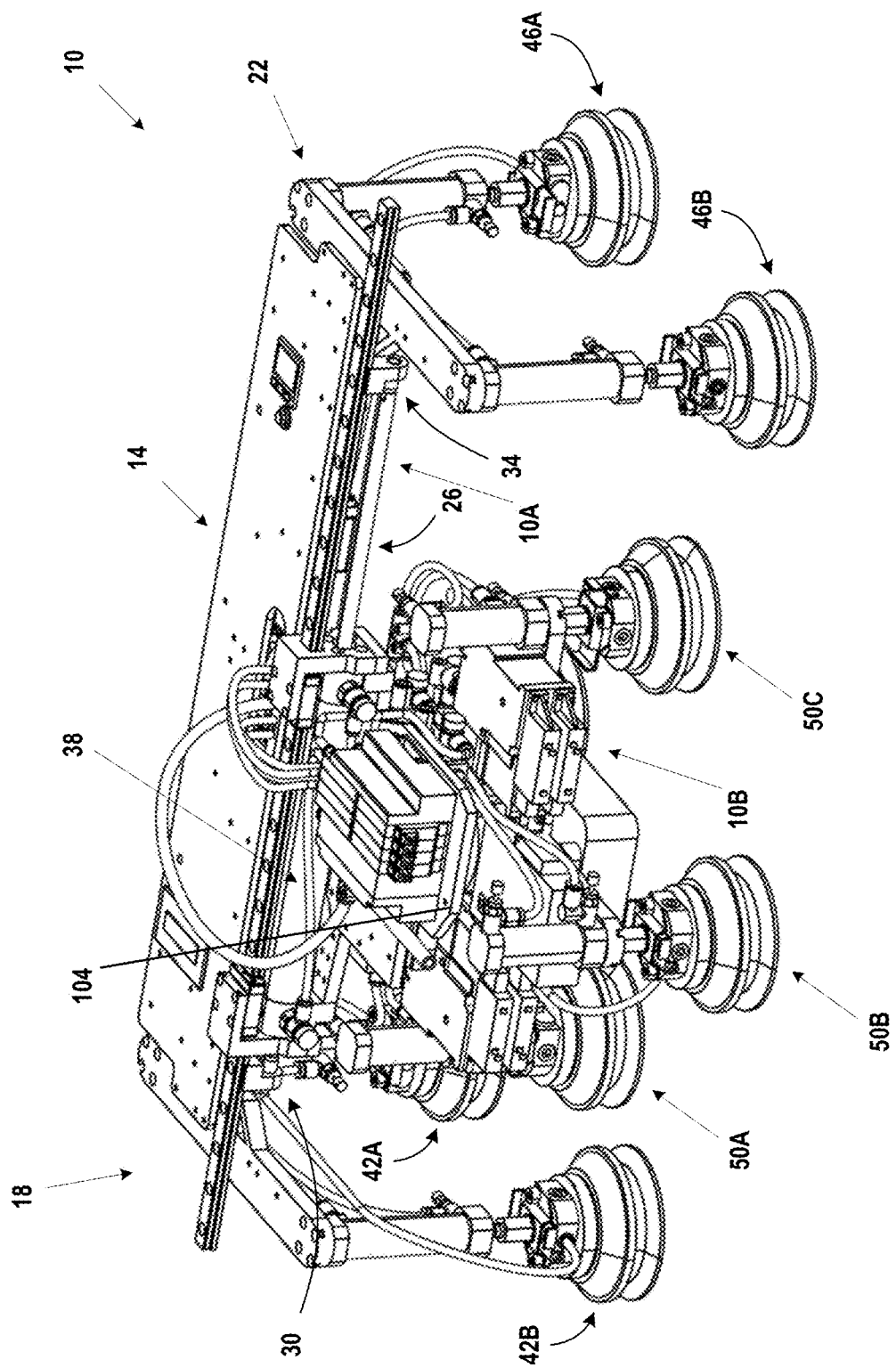
FIG. 1 is a perspective view of an example embodiment of a robot in accordance with the teachings herein.

Further aspects and features of the example embodiments described herein will appear from the following description taken together with the accompanying drawings.

DESCRIPTION OF VARIOUS EMBODIMENTS

Various systems, devices and methods are described below to provide an example of at least one embodiment of the claimed subject matter. No embodiment described herein limits any claimed subject matter and any claimed subject matter may cover systems, devices and methods that differ from those described below. The claimed subject matter is not limited to systems, devices and methods having all of the features of any one systems, device or method described below or to features common to multiple or all of the systems, devices and methods described below. It is possible that a system, device or method described below is not an embodiment of any claimed subject matter. Any subject matter that is disclosed in a system, device or method described herein that is not claimed in this document may be the subject matter of another protective instrument, for example, a continuing patent application, and the applicant (s), inventor(s) and/or owner(s) do not intend to abandon, disclaim, or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as "substantially", "about" and "approximately" as used herein mean a reasonable amount of deviation of the modified term such that the end result is not significantly changed. These terms of degree should be construed as including a deviation of the modified term, such as 1%, 2%, 5%, or 10%, for example, if this deviation does not negate the meaning of the term it modifies.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together. In addition, as used herein, the terms coupled or coupling can indicate that two elements or devices can be directly connected to one another or connected to one another through one or more intermediate elements or devices via an electrical signal, electrical connection, or a fluidic (e.g., pneumatic) pathway depending on the particular context.

Furthermore, the recitation of any numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made, such as 1%, 2%, 5%, or 10%, for example, if the end result is not significantly changed.

Unless the context requires otherwise, throughout the specification and claims which follow, the word "comprise" and variations thereof, such as, "comprises" and "comprising" are to be construed in an open, inclusive sense, that is, as "including, but not limited to".

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any operable combination thereof. Accordingly, the term "any combination thereof" is meant to cover any operable combination of the elements which precede the phrase. For example, the phrase "A, B, C, D or any combination thereof" includes A; B; C; D; A and B; A and C; A and D; B and C; B and D; C and D; A, B and C; A, B and D; A, C and D; B, C and D as well as A, B, C and D assuming that all such combinations are operable (i.e., they can be used together in practice in a working embodiment).

Reference throughout this specification to "one embodiment", "an embodiment", "at least one embodiment" or "some embodiments" means that one or more particular features, structures, or characteristics may be combined in any suitable manner in one or more embodiments, unless otherwise specified to be not combinable or to be alternative options.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

A portion of the example embodiments of the systems, devices, or methods described in accordance with the teachings herein may be implemented as a combination of hardware or software. For example, a portion of the embodiments described herein may be implemented, at least in part, by using one or more computer programs, executing on at least one processing element, and at least one data storage element (including volatile and non-volatile memory). These devices may also have at least one input device (e.g., a keyboard, a mouse, a touchscreen, other input elements or any operable combination thereof) and at least one output device (e.g., a display screen, a printer, a wireless radio, other output elements or any operable combination thereof) depending on the type of device.

It should also be noted that there may be some elements that are used to implement at least part of the embodiments described herein that may be implemented via software that is written in a high-level procedural language such as object-oriented programming. The program code may be written in C, C++ or any other suitable programming language and may comprise modules or classes, as is known to those skilled in object-oriented programming. Alternatively, or in addition thereto, some of these elements implemented via software may be written in assembly language, machine language, or firmware as needed.

At least some of the software programs used to implement at least one of the embodiments described herein may be stored on a storage media or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions, such as program code, for one or more processors. The program code may be preinstalled and embedded during manufacture and/or may be later installed as an update for an already deployed computing system. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g., downloads), media, digital and analog signals, and the like. The computer useable instructions may also be in various formats, including compiled and non-compiled code.

Accordingly, any device described herein that executes software instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of the device or accessible or connectable thereto.

The following description is not intended to limit or define any claimed or as yet unclaimed subject matter. Subject matter that may be claimed may reside in any combination or sub-combination of the elements or process steps disclosed in any part of this document including its claims and figures. Accordingly, it will be appreciated by a person skilled in the art that an apparatus, system or method disclosed in accordance with the teachings herein may embody any one or more of the features contained herein and that the features may be used in any particular combination or sub-combination that is physically feasible and realizable for its intended purpose.

Recently, there has been a growing interest in robots, especially robots that are capable of climbing surfaces at various inclines and/or moving along surfaces. At least one of the embodiments of the robots described herein provides the advantage of being lightweight and precisely controllable. At least one of the embodiments of the robots described herein is also capable of climbing surfaces at any angle, including climbing vertical surfaces, below horizontal surfaces, and along curved surfaces.

Referring first to FIG. 1, shown therein is an example embodiment of a robot 10 that generally includes a linear translation section 10A and a rotational section 10B. The robot 10 is capable of climbing surfaces at various inclines and/or moving along surfaces. The linear translation section 10A may be referred to as a frame while the rotational section 10B may be referred to as a cross. The linear translation section 10A is described in more detail with respect to FIGS. 2A-3B and the rotational section 10B is described in more detail with respect to FIGS. 4A-4B and 8. The actuating and control mechanisms that may be employed by the robot are described in more detail with respect to FIGS. 5A, 5B, 6 and 9.

Figure 3A:
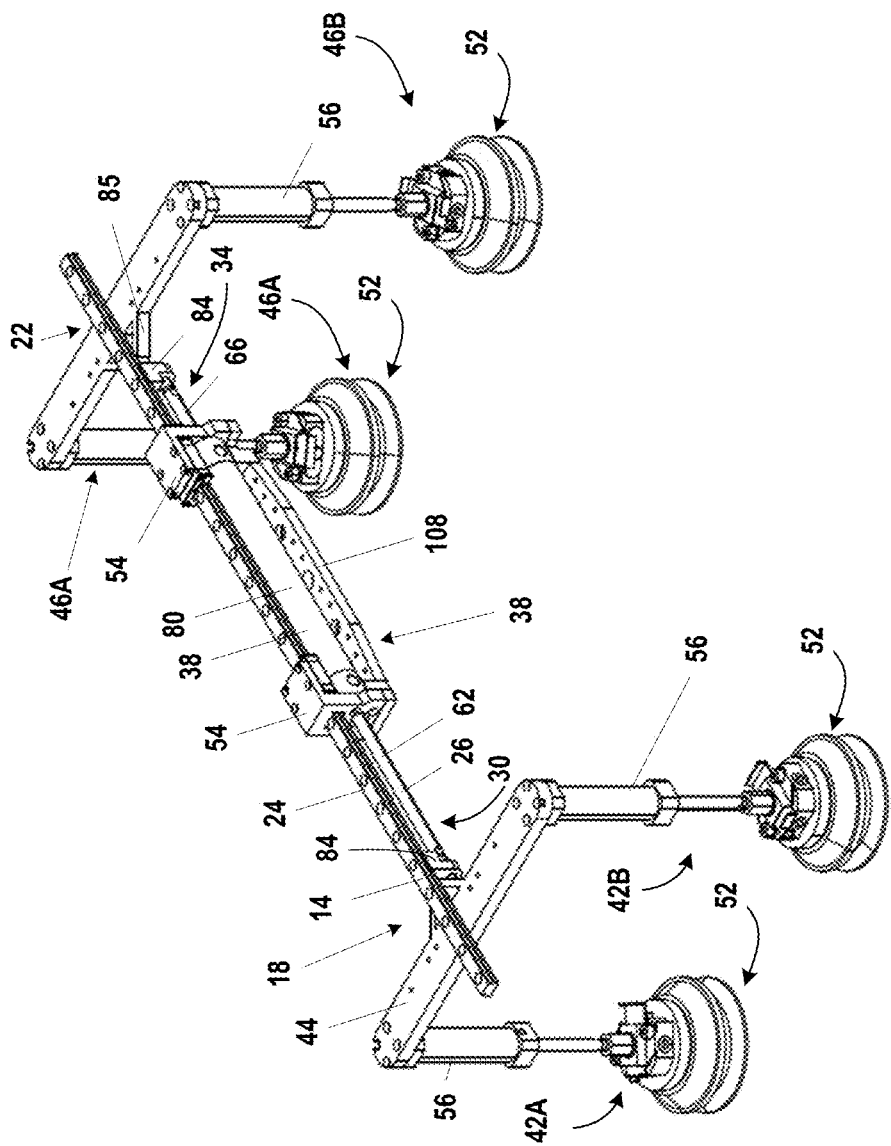
FIG. 3A is a detailed perspective view of the frame, track, carrier, first feet and second feet of the robot of FIG. 1.
Figure 3B:
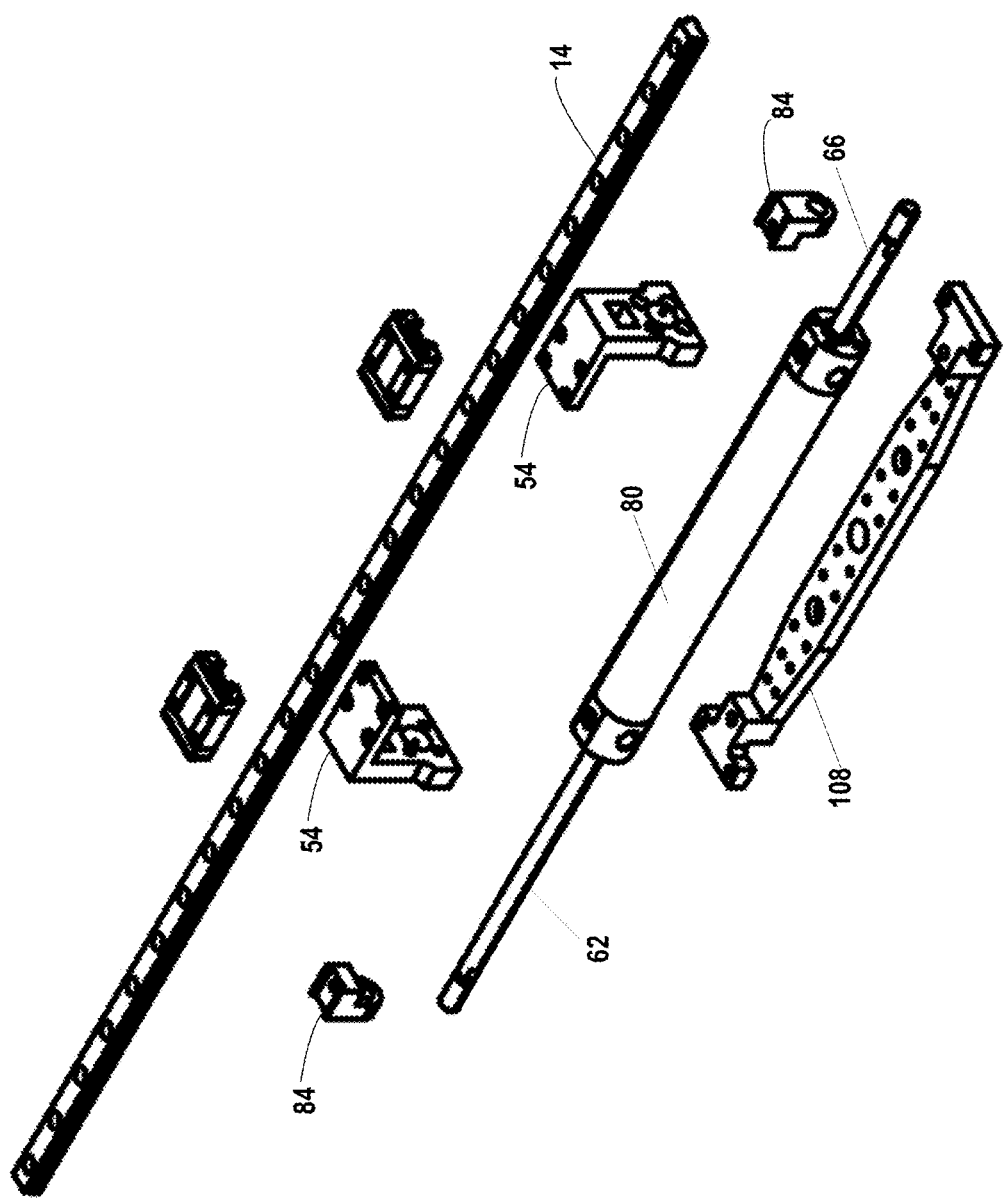
FIG. 3B shows an exploded view of the frame, track and carrier of FIG. 3A.

As shown in FIGS. 1 and 3A, the robot 10 has a frame 14 with a first frame end 18 and a second frame end 22. The frame 14 extends longitudinally between the first frame end 18 and the second frame end 22. As shown in FIGS. 3A and 3B, the frame 14 may be constructed from a single longitudinally extending beam 24. In other examples, the frame 14 may include additional beam members arranged in parallel or transverse to each other and may be of any shape and size known in the art. It may be desirable for the frame 14 to include a single beam 24, as shown, to limit the weight of the robot 10, where the beam has sufficient rigidity for structural stability.

Still referring to FIGS. 3A and 3B, the robot 10 also includes a track 26. The track 26 has a first track end 30 and a second track end 34 and extends longitudinally therebetween. The first track end 30 may be positioned proximate to the first frame end 18 (i.e., closer to the first frame end 18 than the second frame end 22) and the second track end 34 may be positioned proximate to the second frame end 22 (i.e., closer to the second frame end 22 than the first frame end 18). In the example shown, the track 26 and the frame 14 are aligned (i.e., extend parallel to each other). As shown, the track 26 may be suspended below the frame 14 and the track 26 may be colinear with the frame 14. In at least one example embodiment, the track 26 and the frame 14 may be integrally formed.

Referring to FIGS. 1 and 3A, a carrier 38 is coupled to the track 26 and is translatable along the track 26 between the first track end 30 and the second track end 34. Any carrier 38 and any means known in the art for drivingly coupling the carrier 38 to the track 26 may be used.

In the example embodiment illustrated, the track 26 consists of two rods of a double rod piston cylinder and the carrier 38 consists of a cylinder of the double rod piston cylinder (this configuration of the track 26 and carrier 38 is described in more detail below). In at least one other embodiment, for example, the track 26 may be configured as a rack gear and the carrier 38 may include a pinion gear operable to translate the carrier 38 along the rack gear (i.e., along the track 26). In at least one other embodiment, for example, the track 26 may be configured as a cylinder tube and the carrier 38 may be configured as a shuttle of a rodless cylinder (e.g., a cable-type cylinder, a flexible wall-type cylinder, magnetically-coupled-type cylinder, or a slotted-type cylinder).

Still referring to FIGS. 3A-3B, the robot 10 also includes at least one first foot that is movably mounted to the first frame end 18. For instance, in the example embodiment illustrated in FIGS. 3A-3B, the robot 10 has two first feet 42A, 42B. Each of the two first feet 42A, 42B are mounted to the first frame end 18 by a bracket 44 and members 56 extend between the bracket 44 and the first feet 42A, 42B. In other example embodiments, the robot 10 may include a single foot that is movably mounted directly to the frame 14 or more than two first feet 42A, 42B. Any means known in the art may be used to movably mount the first feet 42A, 42B to the frame 14; however, it is preferable to implement this such that the at least one first foot is pneumatically driven to move in a linear fashion.

The robot 10 also includes at least one second foot that is movably mounted to the second frame end 22. Any means known in the art may be used to mount each foot of the at least one second feet to the frame 14; however, it is preferable to implement this such that the at least one second foot is pneumatically driven to move in a linear fashion. In the example shown in FIGS. 3A-3B, the robot 10 has two first feet 42A, 42B and two second feet 46A, 46B; however, the number of first feet and the number of second feet may vary in other example embodiments. For example, the robot 10 may include a single first foot and two or more second feet in other embodiments.

The robot 10 also includes at least one third foot (see FIG. 1). In the example illustrated, the robot 10 includes four third feet 50A, 50B, 50C, 50D. The at least one third foot is mounted to the carrier 38 so that the at least one third foot may translate along the track 14 with movement of the carrier 38. Any means known in the art may be used to mount the at least one third foot to the carrier 38. In at least one embodiment, as shown, the at least one third foot 50 may be mounted to the carrier 38 so that the at least one third foot 50 is also rotatable relative to the track 26. For example, a rotation cylinder 104 (described in more detail below) may be used to rotate each of the at least one third feet relative to the frame 14. However, in other embodiments, any suitable rotation member may be used to rotate the at least one third foot relative to the track 26. In at least one embodiment, the at least one third foot is also movably mounted to the rotation cylinder 104 such that the at least one third foot is pneumatically driven to move in a linear fashion.

In at least one example embodiment, each of the at least one first foot, each of the at least one second foot, and each of the at least one third foot may include a respective grip 52 for securing the robot 10 to a support surface (not shown). The support surface may be a horizontal, vertical or angled surface such as, but not limited to, a wall, a window, a roof, or a portion of a wind turbine. The grip 52 may be, for example, a suction cup, a permanent magnet, or an electromagnet. It will be appreciated that when configured as a permanent magnet, the linear actuator(s) for translating the robot between first and second positions (described in more detail below) is strong enough to disengage the permanent magnet from the support surface. In the example illustrated, each foot 42A-42B, 46A-46B, and 50A-50D includes a suction cup. The type of grip 52 selected may vary depending on the task to be performed by the robot 10.

An activation member may be used to control activation of each the respective grips 52. In the example illustrated, the grips 52 of each of the at least one first foot 42A-42B, the at least one second foot 46A-46B, and the at least one third foot 50A-50B are individually pneumatically actuated. That is, for example, a pneumatic actuator is used to "turn on" the suction of a suction cup by reducing the gas pressure between the suction cup and the support surface it is residing on to create an air-tight seal and "turn off" the suction of a suction cup by increasing the gas pressure between the suction cup and the support surface it is residing on. The suction cups may be implemented using a ZHP series vacuum pad with an ejector which includes its own vacuum generator and is made by the SMC Corporation of America.

Figure 2A:
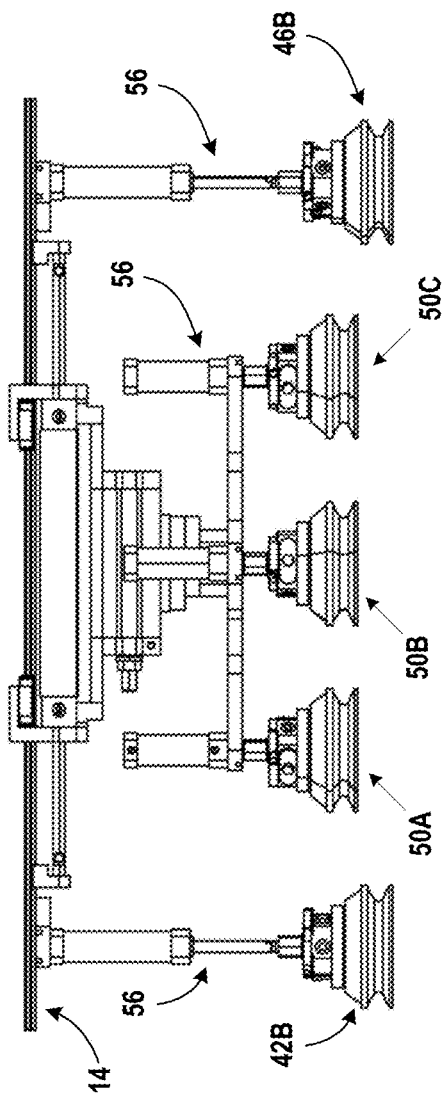
FIG. 2A is a side view of the robot of FIG. 1, showing third feet of the robot in a first position.
Figure 2B:
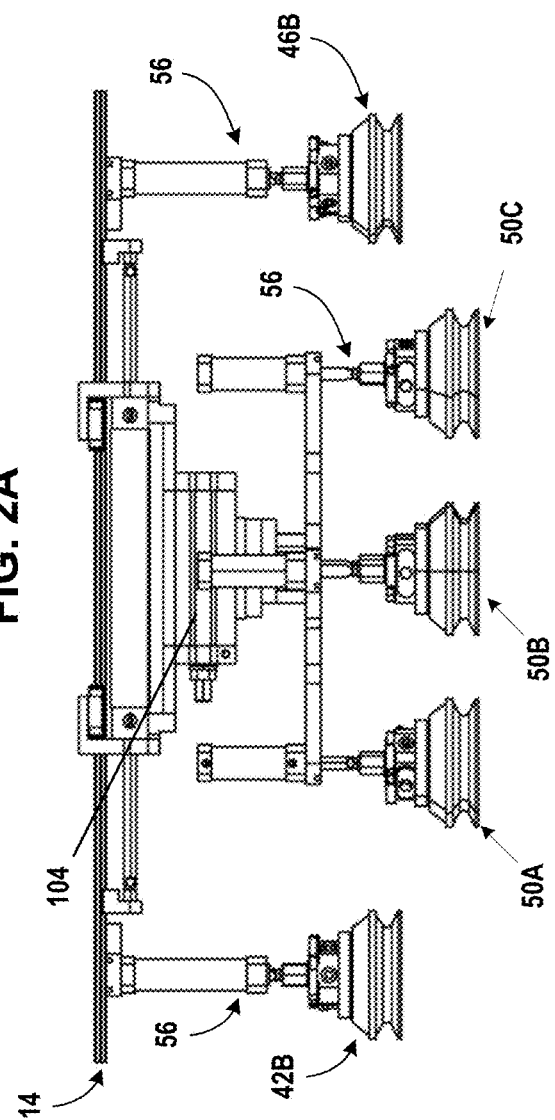
FIG. 2B is a side view of the robot of FIG. 1, showing third feet of the robot in a second position.

Reference is now made to FIGS. 2A and 2B to describe the operation/motion of the robot 10. As shown in FIGS. 2A and 2B, at least one of: (a) the at least one first foot 42A-42B, (b) the at least one second foot 46A-46B, and (c) the at least one third foot is linearly displaceable (i.e., movable toward and away from the frame 14) so that the at least one third foot 50A-50D is positionable between first and second positions.

In the first position (see, e.g., FIG. 2A), the at least one third foot 50A-50D is positioned closer to the frame 14 compared to the at least one first foot 42A-42B and the at least one second foot 46A-46B. In the second position (see e.g., FIG. 2B), the at least one third foot 50A-50D is positioned farther away from the frame 14 than the at least one first foot 42A-42B and the at least one second foot 46A-46B. Accordingly, the robot 10 can maintain contact on the support surface (not shown) using: (a) the at least one first foot 42A-42B and the at least one second foot 46A-46B (as indicated by FIG. 2A); (b) the at least one third foot 50A-50D (as indicated by FIG. 2B); or (c) the at least one first foot 42A-42B, the at least one second foot 46A-46B, and the at least one third foot 50A-50D.

In the example illustrated, each of the at least one first foot 42A-42B, each of the at least one second foot 46A-46B, and each of the at least one third foot 50A-50D are linearly displaceable via respective a single rod piston cylinder 56. However, it will be appreciated that in other examples, only each of the at least one third foot 50A-50D may be linearly displaceable and the at least one third foot 50A-50D may be positionable in the first and second positions (i.e., the at least one first foot 42A-42B and the at least one second foot 46A-46B may not be linearly displaceable). In yet another example, only each of the at least one first foot 42A-42B and the at least one second foot 46A-46B may be linearly displaceable and the at least one third foot 50A-50D may be positionable in the first and second positions (i.e., the at least one third foot 50A-50D may not be linearly displaceable).

When the at least one third foot 50A-50D is in the first position (i.e., closer to the frame 14 than the at least one first foot 42A-42B and the at least one second foot 46A-46B as shown in FIG. 2A), the at least one third foot 50A-50D may be translated by the carrier 38 along the track 26 without contacting the support surface. Optionally, when translating the at least one third foot 50A-50D, the grips 52 of the at least one first foot 42A-42B and the at least one second foot 46A-36B may be actuated (i.e., the suction is "turned on") to secure the robot 10 to the support surface. Likewise, when the at least one third foot 50A-50D is in the second position (i.e., further away from the frame 14 than the at least one first foot 42A-42B and the at least one second foot 46A-46B as shown in FIG. 2B), the at least one first foot 42A-42B and the at least one second foot 46A-46B may be linearly translated relative to the at least one third foot 50A-50D by translating the carrier 38 along the track 26. When in the second position, the at least one third foot 50A-50D may remain stationary relative to the support surface and the at least one first foot 42A-42B and the at least one second foot 46A-46B may translate relative to the support surface and to at least one third foot 50A-50D without contacting the support surface. Optionally, when translating the at least one first foot 42A-42B and the at least one second foot 46A-46B relative to the at least one third foot 50A-50D and to the support surface, the respective grips 52 of the at least one third foot 50A-50D may be actuated (i.e., the suction is "turned on") to secure the robot 10 to the support surface.

Accordingly, the robot 10 can walk along the support surface in a straight line by: (a) positioning the at least one third foot 50A-50D in the first position; (b) translating the at least one third foot 50A-50D toward the first end 30 of the track 26; (c) positioning the at least one third foot 50A-50D in the second position; (d) moving the carrier 38 along the track so that the at least one third foot 50A-50D is positioned near the second end 34 of the track 26; and repeating steps (a)-(d) as desired. Optionally, before step (a), the respective grips 52 of the at least one first foot 42A-42B may be deactivated (e.g., the suction is removed). Optionally, before step (a) or step (b), the respective grips 52 of the at least one first foot 42A-42B and the grip of the at least one second foot 46A-46B may be activated (e.g., the suction is applied). Optionally, after step (b) or step (c), the respective grips 52 of the at least one third foot 50A-50D may be activated (e.g., the suction is applied). Optionally, before step (c) the respective grips 52 of the at least one first foot 42A-42B and the at least one second foot 46A-46B may be deactivated (e.g., the suction is deactivated).

To turn the robot 10, when the at least one third foot 50A-50D is in the second position, the at least one third foot 50A-50D can be rotated relative to the frame 14 via the rotation cylinder 104, which will cause the at least one first foot 42A-42B and the at least one second foot 46A-46B to pivot about the at least one third foot 50A-50D, defining a new direction of travel. In at least one embodiment, the amount of rotation may vary between 0 and 190 degrees. When the at least one third foot 50A-50D is being rotated, the at least one first foot 42A-42B and the at least one second foot 46A-46B may be deactivated (e.g., the suction is removed) and/or they may be in the first position.

Configuring the Track and Carrier as a Double Rod Piston Cylinder

As stated above, the track 26 and the carrier 38 may be implemented using a double rod piston cylinder. More specifically, with reference to FIGS. 3A and 3B, the track 26 may include a first rod 62 of a double rod piston cylinder and a second rod 66 of the double rod piston cylinder. The carrier 38 may be a cylinder 80 of the double rod piston cylinder. The double rod piston cylinder may be implemented using a CG1W series standard type double acting double rod cylinder made by the SMC Corporation of America.

The double rod piston cylinder may be hydraulically or pneumatically controlled. In the example shown in FIGS. 3A-3B, the double rod piston cylinder is pneumatically controlled. A pneumatically controlled double rod piston cylinder can translate the cylinder 80 along the first and second rods 62, 66 thereof by varying the relative gas pressure within different halves of the cylinder 80.

As shown in FIGS. 3A-3B, the first rod 62 and the second rod 66 of the double rod piston cylinder each extend outwardly from opposite ends of the cylinder 80 and the distal ends of the rods 62 and 66 form the distal ends of the double rod piston cylinder. In the example illustrated, the distal ends of the first rod 62 and the second rod 66 are connected to the frame by couplers 84. Support braces 85 may also be used to provide additional structural support for the connection of the beam 24 and bracket 44.

General Description of a Support Link

Optionally, the robot 10 may include at least one support link 54 extending between the carrier 38 and the frame 14. It may be desirable to include the support link 54 to increase the rigidity of the track 26 and the carrier 38. Any number of support links 54 may be included and may vary depending on the configuration (e.g., length) of the track 26. In the example illustrated, the robot 10 includes two support links 54 positioned at opposite ends of the cylinder 80. As shown in FIG. 3A, each support link 54 may be rigidly coupled to the carrier 38 and may translate along the frame 14 with translation of the carrier 38 along the track 26. The support links 54 may be implemented by connecting sliders that move along the top of the beam 24, which may be referred to as a linear guide, to brackets that have a lower portion that may be coupled to the one of the rods of the double-piston cylinder.

General Description of Linearly Displaceable Feet

As described above, at least one of the at least one first foot 42A-42B, the at least one second foot 46A-46B, and the at least one third foot 50A-50D may be linearly movable/displaceable. Any linear actuator known in the art for linearly displacing a foot may be used. Further, it is to be understood that the robot 10 may include a first type of linear actuator for a first foot (e.g., rack and pinion linear actuator) and a different second type of linear actuator for a second foot (e.g., a pneumatic or hydraulic piston cylinder). However, in various embodiments, pneumatic actuators may be preferred for reducing the weight of the robot 10.

Referring to FIG. 1, in the example illustrated, each of the first feet 42A-42B, the second feet 46A-46B, and the third feet 50A-50D include a respective single rod piston cylinder 56 that is operable to linearly displace the respective foot. For example, the single rod piston cylinder 56 is preferably pneumatically actuatable to extend or retract in order to move a foot farther away from or closer towards the frame 14 of the robot 10 during locomotion/movement.

General Description of a Rotation Cylinder

Figure 4B:
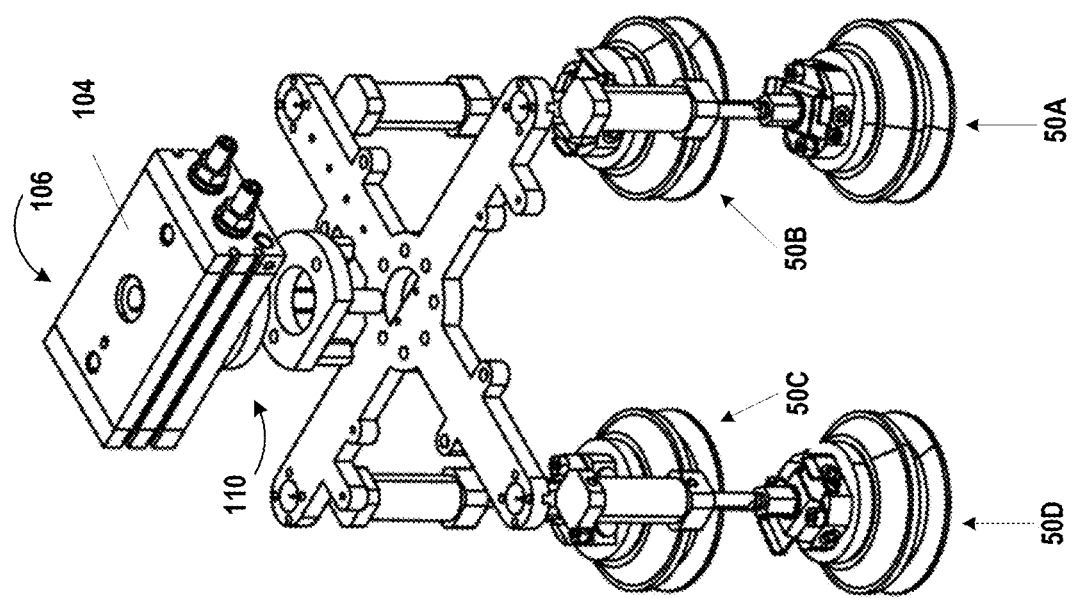
FIG. 4B is an exploded view of the rotation cylinder and the third feet of FIG. 4A.
Figure 4A:
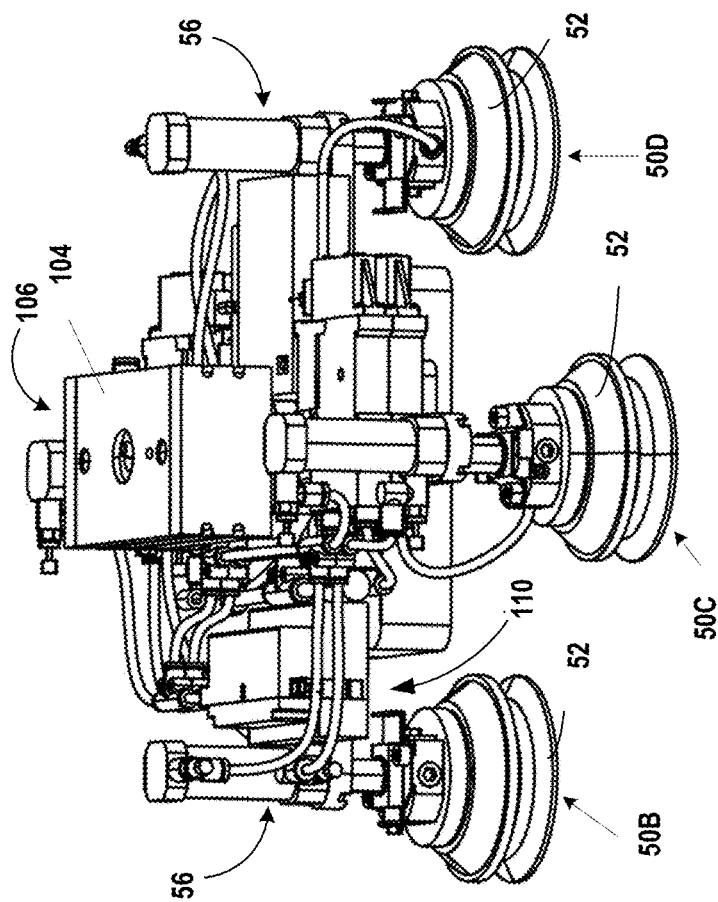
FIG. 4A is a detailed perspective view of a rotation cylinder and the third feet of the robot of FIG. 1.

As described above, the at least one third foot 50A-50D may be rotatable relative to the track 26 and/or the frame 14. In at least one example embodiment, the rotation cylinder 104 may be used to rotate each foot of the at least one third foot 50A-50D relative to the track 26 and/or the frame 14. Referring now to FIGS. 4A-4B, shown therein is an example embodiment of the rotation cylinder 104. The rotation cylinder 104 illustrated is pneumatically controlled. For example, the rotation cylinder 104 may be implemented using an MSQ series rotary table that is made by the SMC Corporation of America. However, in other example embodiments, the rotation cylinder 104 may be hydraulically controlled.

With reference to FIGS. 4A-4B, an upper end 106 of the rotation cylinder 104 may be rigidly coupled to a support bracket 108 of the carrier 38 (see also FIG. 3A). A lower end 110 of the rotation cylinder 104 may be coupled to each foot of the at least one third foot 50A-50D. The upper end 106 of the rotation cylinder 104 is rotatable relative to the lower end 110 thereof. Accordingly, each foot of the at least one third foot 50A-50D may be rotated relative to the frame 14 and/or the track 26 by the rotation cylinder 104. For example, the amount of rotation may be up to 190 degrees.

General Description of a Universal Pneumatic Control System

As described above, (a) each of the at least one first foot 42A-42B, the at least one second foot 46A-46B, and the at least one third foot 50A-50D may be linearly displaceable by a respective pneumatic single rod piston cylinder 56; (b) each of the at least one first foot 42A-42B, the at least one second foot 46A-4B, and the at least one third foot 50A-50D may include a pneumatically controlled grip 52; (c) rotation of the at least one third foot 50A-50D relative to the frame 14 and/or the track 26 may be pneumatically controlled; and (d) translation of the carrier 38 along the track 26 may be pneumatically controlled. In some examples of the robot 10, each of (a)-(d) listed above may be controlled by a universal pneumatic control system.

It should be noted that by using a pneumatic implementation for the robot 10, the weight of the robot 10 is reduced. This also allows a pneumatically driven rotation cylinder to be used instead of an electrical motor, which saves the weight of a gearbox and the motor. Several solenoid valves 120 may be used to open/close air/gas pressure circuits 508 that are employed to move the robot 10 in a linear and/or rotational manner as desired. The solenoid valves 120 may be implemented using a solenoid valve cassette type manifold that has several solenoid valves and is produced by the SMC Corporation of America. The gas pressure circuits 508 may be coupled to one another in a pneumatic loop 510 by using different conduits, tubes or pipes that are coupled to various connectors which may include, for example, a cross connector (e.g., gas junction 116), a T distributor 114, a U distributor 115, etc.

Figure 5A:
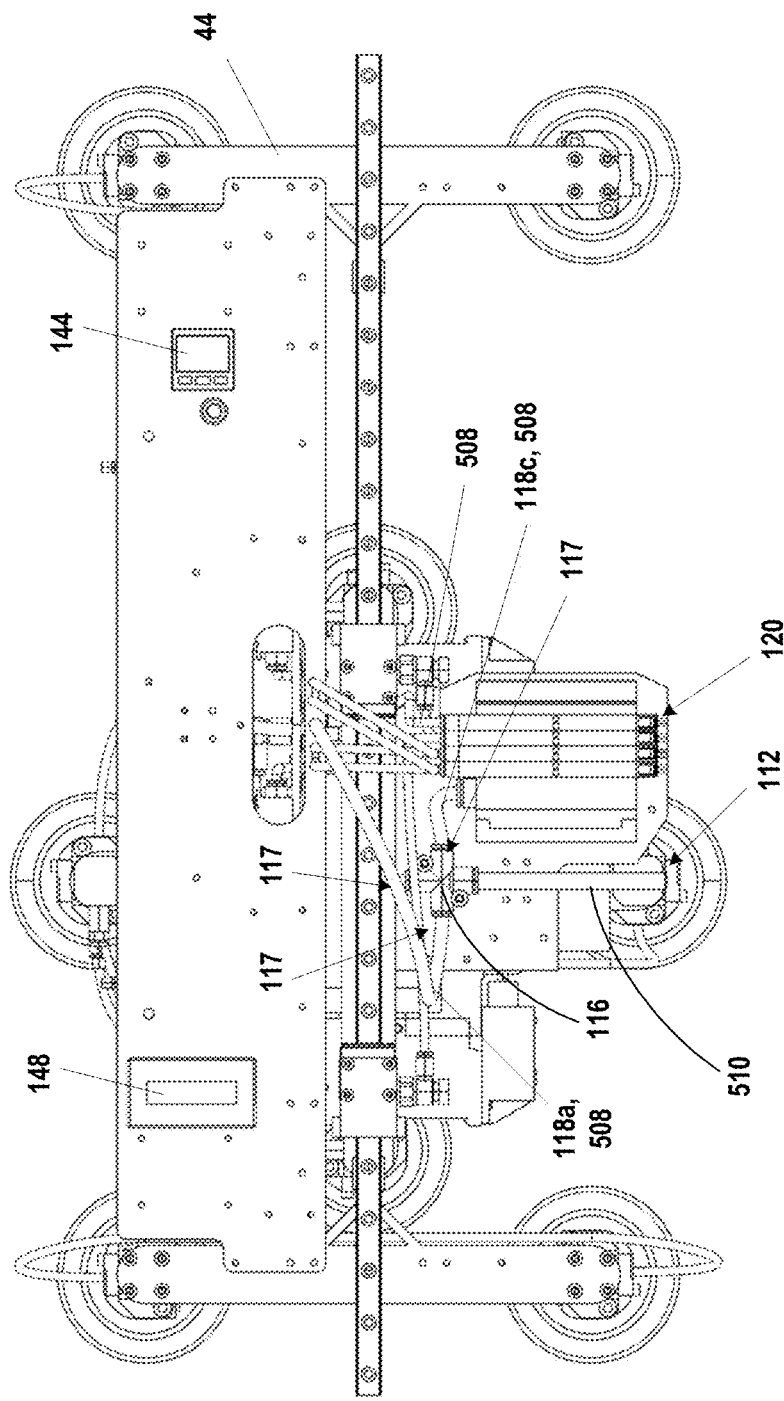
FIGS. 5A and 5B are top and bottom views of a portion of the robot of FIG. 1.
Figure 5B:
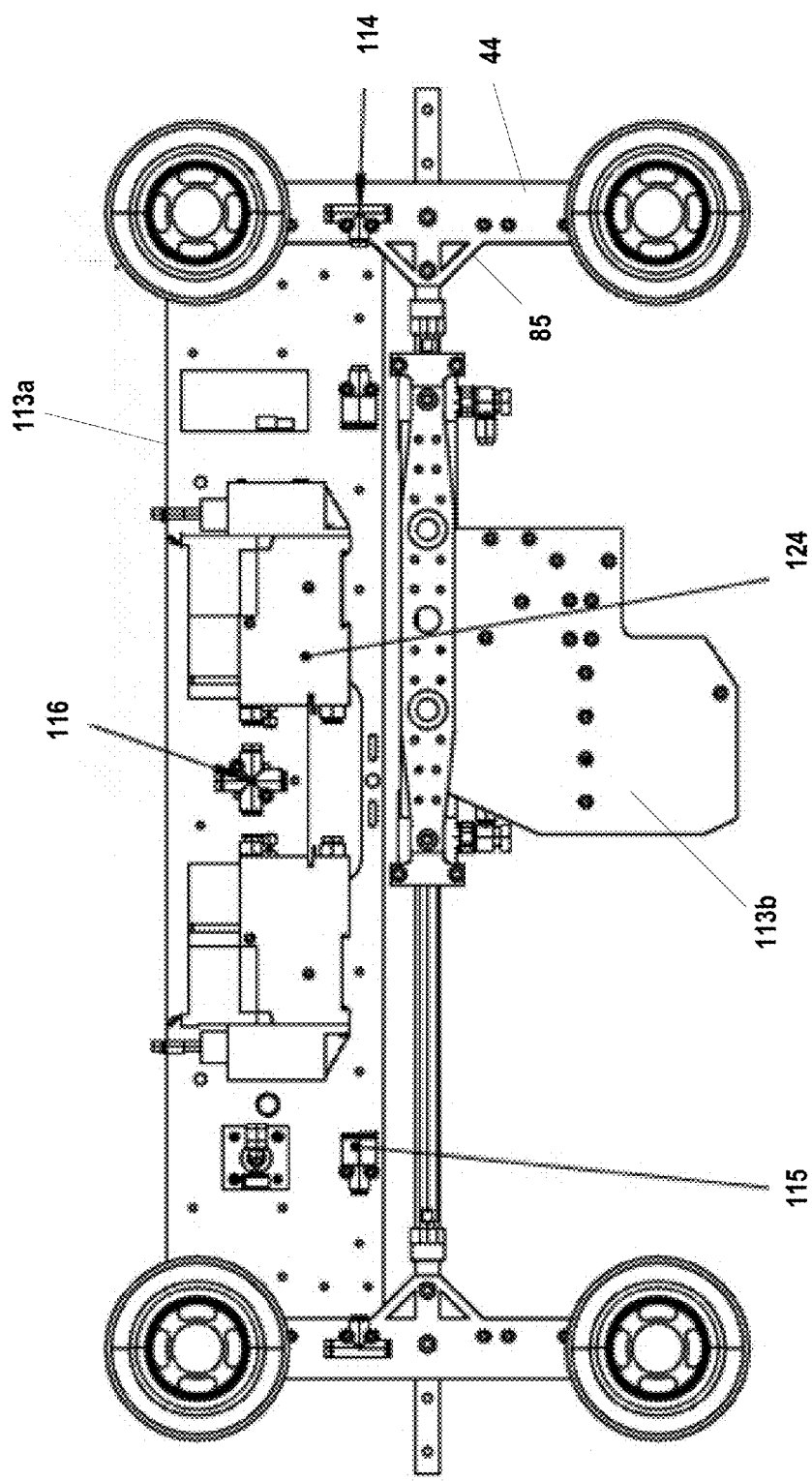

As shown in FIG. 5A, in at least one embodiment, the universal pneumatic control system may include a gas junction 116. The gas junction 116 has an inlet 112 for receiving pressurized gas from a common gas supply. The gas junction 116 has at least one gas outlet 117 for supplying pressurized gas to any number of components of the robot 10. In this example embodiment, the gas junction 116 has three gas outlets 117.

The robot may include a first support board 113*a* that is coupled to front and back brackets 44 and a second support board 113*b* that is coupled to support bracket 108. Various components of the universal pneumatic control system can be mounted on one of the first and second support boards 113*a*, 113*b*.

Figure 11:
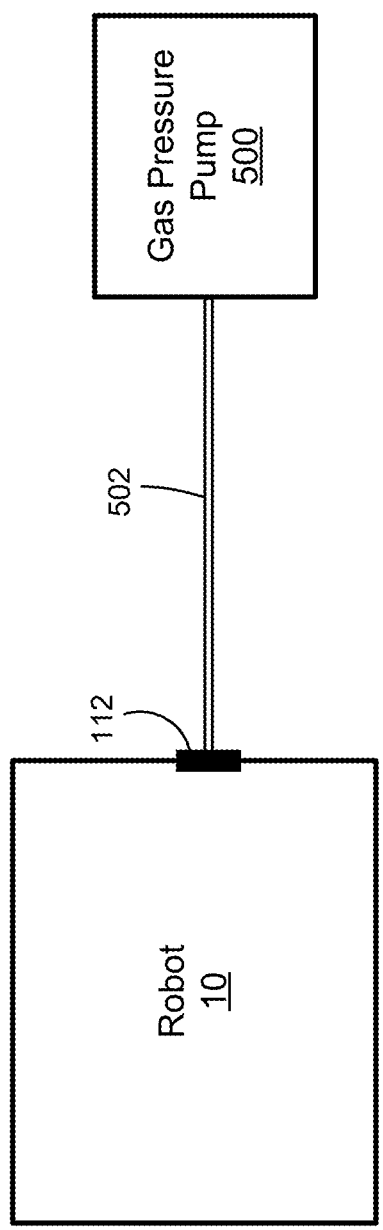
FIG. 11 is a schematic illustration of the robot of FIG. 1 connected to a gas pressure pump.

In at least one embodiment, the common gas supply may be provided by a gas pressure pump 500, which may continuously supply pressurized gas to various components of the robot 10 through various airflow pathways provided by a plurality of conduits/tubes/pipes that interconnect the gas junction 116 with various components that operate using pressurized gas (e.g., the double rod piston cylinder, the piston rod cylinders 56 and the rotation cylinder 104). The inlet 112 is connected to the gas pressure pump 500 via a gas supply tube 502 (e.g., as shown in FIG. 11). The gas pressure pump 500 may be located remotely from the robot 10. The gas pressure pump 500 operates to continuously supply pressurized gas to the robot 10 through the gas supply tube 502, which may be in the order of about 100 meters long.

Figure 6:
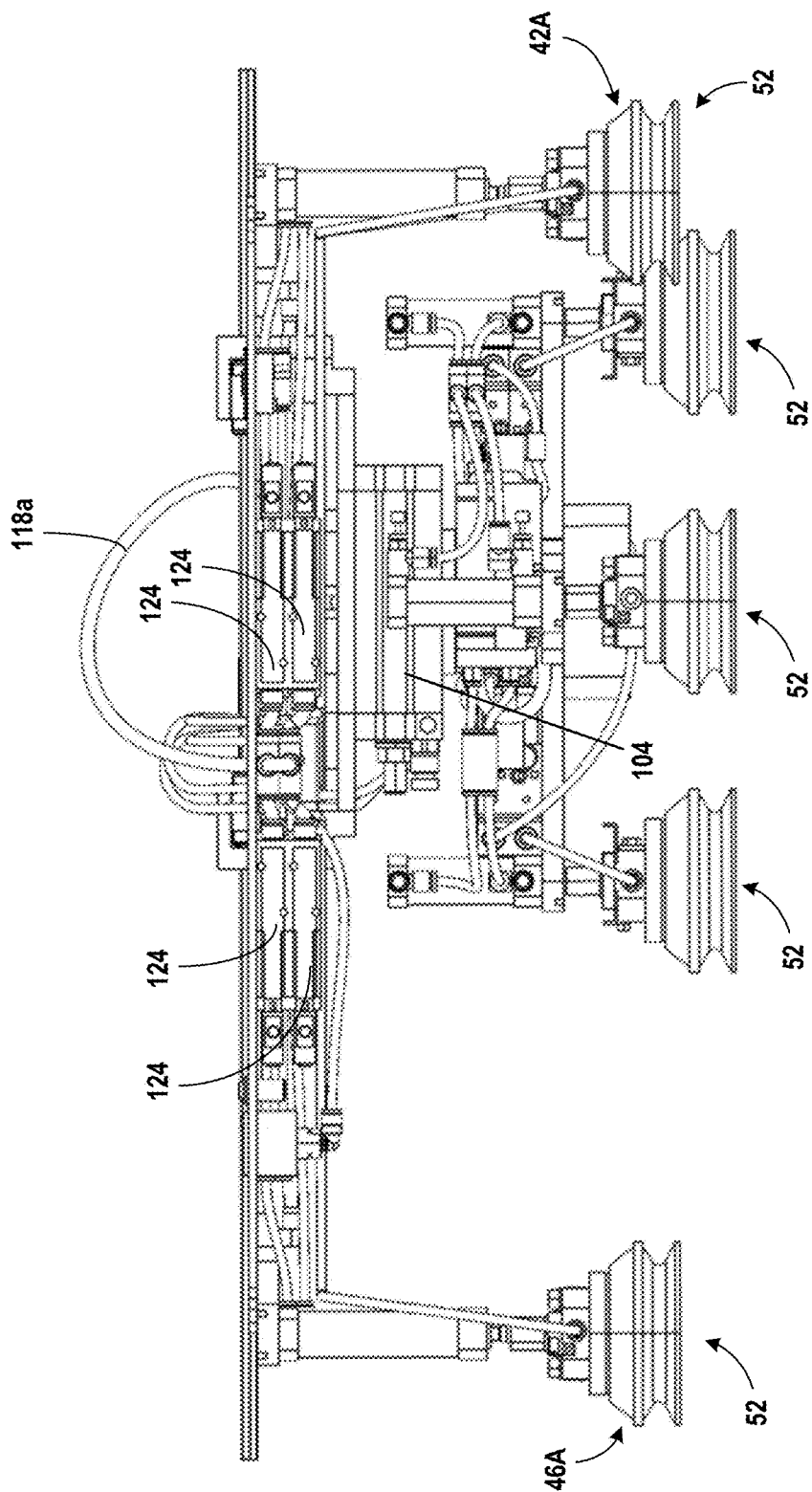
FIG. 6 is a back view of the robot of FIG. 1.

Referring to FIG. 6, when the grip 52 of the first feet 42A-42B and the second feet 46A-46B is implemented using a suction cup, a first gas outlet of the gas outlets 117 of the pressurized gas junction 116 may be pneumatically coupled (e.g., via tubes which may be referred to as pipes or conduits and one of which is labelled 118*a*) to at least one vacuum generator 124. As shown in FIG. 6, for this example embodiment, the robot 10 includes four vacuum generators 124 connected to the first gas outlet of the pressurized gas junction 116, so that there is one vacuum generator 124 for each foot of the first feet 42A-42B and each foot of the second feet 46A-46B.

Figure 8:
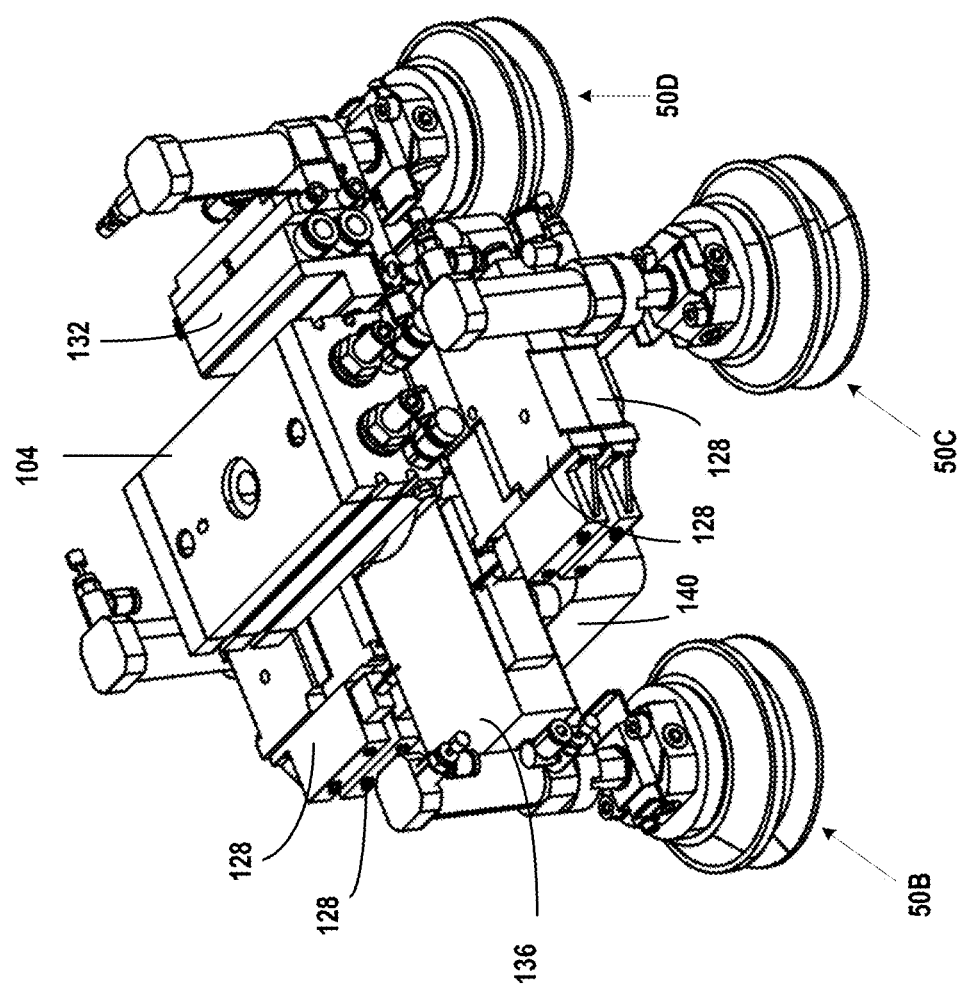
FIG. 8 is a detailed perspective view of the third feet of the robot of FIG. 1.

Likewise, when the grip 52 of the third feet 50A-50D is implemented using a suction cup, a second gas outlet of the gas outlets 117 of the pressurized gas junction 116 may be pneumatically coupled to at least one vacuum generator 128 for actuating the respective suction cups of the at least one third foot 50A-50D. As shown in FIG. 8, for this example embodiment, the robot 10 includes four vacuum generators 128 connected to the second gas outlet of the pressurized gas junction 116, so that there is one vacuum generator 128 for each foot of the third feet 50A-50D.

The second gas outlet 117 that is pneumatically coupled to the vacuum generators 128 for actuating the respective suction cups of the feet 50A-50D may also be pneumatically coupled to a solenoid valve for controlling linear motion of the respective linear actuators (i.e., single rod piston cylinders 56) for linearly displacing the feet 50A-50D. That is, the second gas outlet of the pressurized gas junction 116 may be split into two lines, in which a first line is connected the at least one vacuum generator 128 for the third feet 50A-50D and a second line is connected to a solenoid valve for operating each linear actuator of the feet 50A-50D. A single solenoid valve can operate multiple linear actuators if/when each linear actuator operated by that solenoid valve moves in parallel. That is, for example, a single solenoid valve can operate the linear actuators for the first feet 42A-42B and the second feet 46A-46B when each of the first feet 42A-42B and the second feet 46A-46B move in parallel. Likewise, a single solenoid valve can operate each of the third feet 50A-50D in parallel.

In at least one embodiment, the vacuum generators 124 used to control the suction cups of the at least one first foot 42A-42B and the at least one second foot 46A-46B, and the vacuum generators 128 used to control the at least one third foot 50A-50B may be implemented using a vacuum ejector which receives pressurized gas from the common gas supply 116.

As noted above, the robot 10 may include a separate vacuum generator for each of the at least one first foot 42A-42B, the at least one second foot 46A-46B, and the at least one third foot 50A-50D. It may be desirable to provide separate vacuum generators for each suction cup so that if one vacuum generator were to fail, the other vacuum generators would remain unaffected and the robot 10 may remain operational.

In at least one embodiment, pressurized gas from a third gas outlet of the gas outlets 117 may be supplied, through conduit 118c, to a bank of solenoid valves. In the example shown, conduit 118c supplies pressurized gas to four solenoid valves 120 that control the flow of pressurized gas to various components including (1) the main cylinder of the double rod piston cylinder; (2) the rotation cylinder 104; (3) a solenoid valve for operating each linear actuator of the feet 42A-42B and the feet 46A-46B; and (4) and an optional clip for securing the robot 10 to a deployment system (described in more detail below).

Figure 7B:
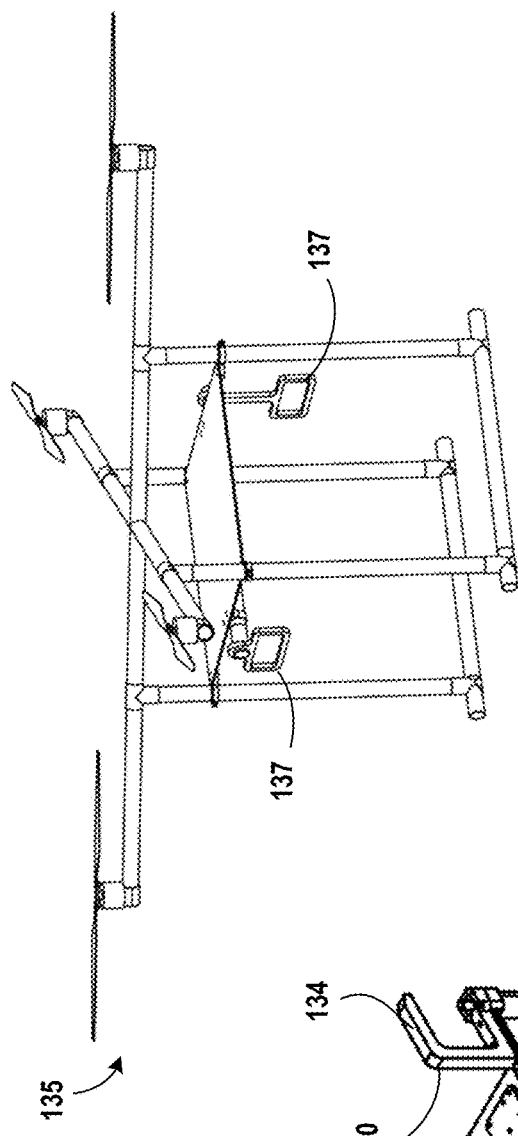
FIG. 7B is a perspective view of an example embodiment of a drone.
Figure 7A:
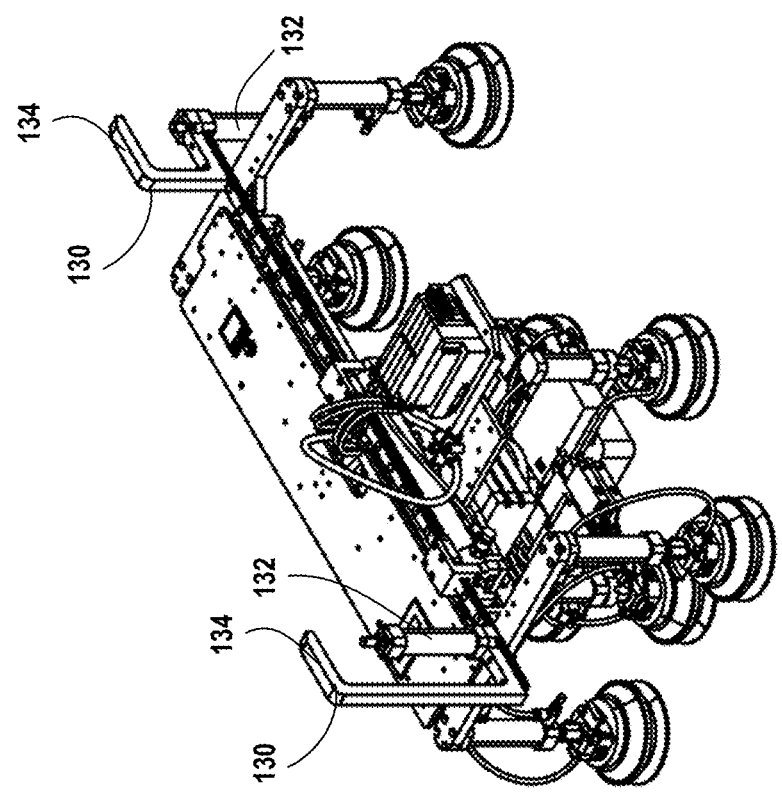
FIG. 7A is a perspective view of the robot of FIG. 1 equipped with a clip.

Optionally, the robot 10 may include at least one pneumatically actuated clip 130. FIG. 7A shows an example embodiment of the robot 10 with two clips 130. The clip 130 may include a clip pneumatic cylinder 132 which may be pneumatically actuated. The clip 130 may be removably attached to the robot 10 at any suitable location. The clips 130 in the example embodiment of FIG. 7A are attached to the frame 14, with one clip attached towards the first frame end 18 and the other towards the second frame end 22. The clip may be used to secure the robot 10 to a deployment system. The clip 130 may have different structures depending on the deployment system the robot 10 may be secured to. The clip 130 in the example embodiment of FIG. 7A has a hook 134. In at least one embodiment, as shown in FIG. 7B, the deployment system may be a drone 135. Accordingly, for example, in at least one embodiment, the robot 10 may be securable to a drone 135, flown to a support surface (e.g., a blade of a wind turbine), and released from the drone 135 by actuation of the clip 130 once the robot 10 is in place and secured to the support surface. The drone 135 in the example embodiment of FIG. 7B has rings 137. The hooks 134 may be placed through the rings 137 and the clips 130 may be pneumatically actuated to clamp the robot 10 to the rings 137.

General Description of Control and Monitoring Systems

The robot 10 includes a controller 136, or other processor, that executes software for controlling the motion and operation of the robot 10 (e.g., controlling the supply of pressurized gas to various components to perform various actions). The controller 136 may be positioned at any suitable location on the robot 10. The robot 10 also includes a battery 140 for supplying power to the controller 136 and other components that may require electrical power (e.g., one or more sensors, and/or a servo motor for operating a pinion gear when the track 26 is configured as a rack gear in at least one alternative embodiment).

Referring back to FIG. 5A, in at least one example embodiment, the robot 10 may also include a gas pressure meter 144 for monitoring gas pressure in the pneumatic loop and generating a signal when the gas pressure is too low. For example, the gas pressure meter 144 may measure the gas pressure, compare the measured gas pressure to a minimum pressure threshold value and generate a low pressure signal when the measured gas pressure is less than the minimum pressure threshold value. In at least one embodiment, the gas pressure meter measures the pressure in the pneumatic loop at the at least one vacuum generator 124. A low-pressure signal may be received by the controller 136. Upon receiving a low-pressure signal, the controller 136 may take action to stop the performance of a next/subsequent action which may use further gas. Any further gas pressure reduction may thereby be avoided, and the robot 10 may remain operating with a safe amount of vacuum and a sufficient number of feet maintaining a vacuum contact with the supporting surface. Accordingly, the minimum pressure threshold value may be preset depending on the type of suction cups used as well as the weight of the robot 10. For example, the minimum pressure threshold value may be about 0.5 MPa. In cases where the measured gas pressure is less than the minimum pressure threshold value, the controller 136 may be configured to send a gas supply command signal to the remote operator and/or the gas pressure pump 500 so that further gas is supplied to the robot 10 from the gas pressure pump 500. The gas pressure meter 144 may continue to monitor the gas pressure and compare it to the minimum pressure threshold value while pressurized gas is provided to the robot. The gas pressure meter 144 may then send a "sufficient pressure signal" to the controller 136 when the measured gas pressure is suitably higher than the minimum pressure threshold value; for example, the sufficient pressure signal may be sent to the controller when the measured gas pressure is higher than the minimum pressure threshold value for a predetermined time period. At that point, the controller 136 may then perform the next action which consumes gas pressure. Alternatively, the gas pressure meter 144 may continually send the low-pressure signal to the controller until the robot 10 is provided with enough gas pressure so that the measured gas pressure meets the gas pressure threshold as described previously. In an alternative embodiment, a gas pressure sensor may be used that obtains a measured gas pressure value and the controller 136 is then configured to compare the measured gas pressure value to the minimum pressure threshold value and perform the previously described actions.

In at least one example embodiment, the robot 10 may include a battery voltage meter 148 for monitoring the voltage of the battery 140 and performing certain actions. The battery voltage meter 148 is connected to the battery 140 and may continuously monitor the voltage of the battery 140. The battery voltage meter 148 may be configured to generate a low battery signal that is received by the controller 136 when the measured voltage of the battery 140 drops below a battery voltage threshold value. The controller 136 may then send a recharging signal to a remote operator by a wireless signal to notify the remote operator that the robot 10 needs to be recharged. Alternatively, a wired communication cable/wire may be used that provides a wired connection between the robot and a device used by the remote operator to monitor the operation of the robot 10. The battery voltage threshold value may be set such that the electrical operation of the robot persists at least as long as it takes for the remote operator to control the robot 10 to return to the remote location or another means, such as a drone, is used to transport the robot 10 to the remote operator. For example, if the energy capacity of the battery 140 provides N hours of operation, where N is a real number, then the battery voltage threshold value may be set such that the energy capacity of the battery 140 provides about 20 to 30% of N hours of operation. In an alternative embodiment, a battery voltage sensor may be used that obtains a measured battery voltage value and the controller 136 is then configured to compare the measured battery voltage value to the battery voltage threshold value and perform the aforementioned actions. In at least one embodiment, if the robot 10 must move under its own power to return to the remote operator when there is a low battery voltage, the battery voltage threshold value may be dynamic such that it is increased the further away that the robot 10 is from its operator.

Figure 9:
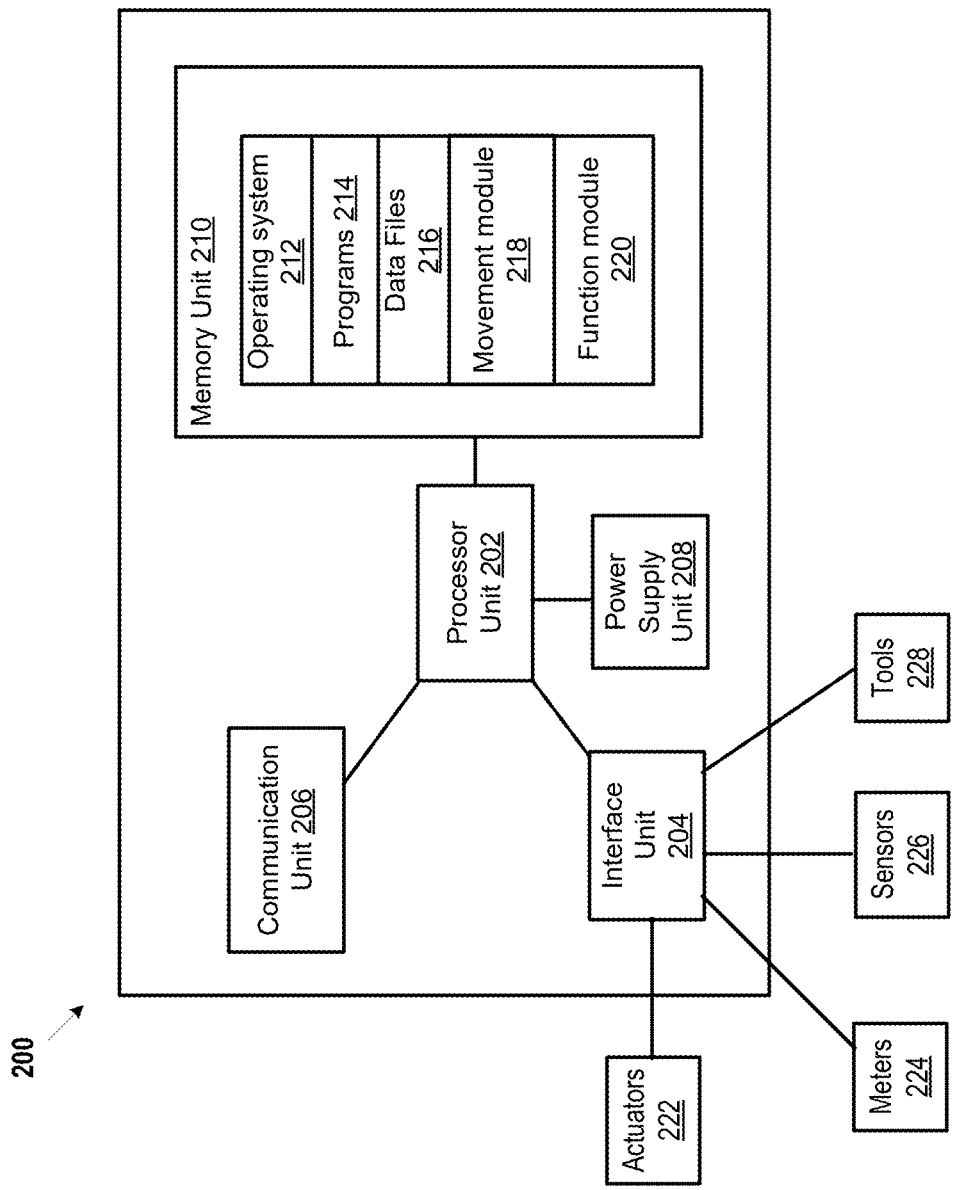
FIG. 9 is a schematic illustration of a controller that may be used with one of the embodiments of the robot described herein.

Referring now to FIG. 9, shown therein is an example embodiment of a controller 200 that may be used with one of the embodiments of the robot described herein. For example, the controller 136 may be implemented using the controller 200. The controller 200 may generally include a processor unit 202, an interface unit 204, a communication unit 206, a power supply unit 208, and a memory unit 210. Various components of the controller 200 may be connected by a communication bus to facilitate communication therebetween and a power bus to receive power from the power supply unit 208. The controller 200 may be connected to other hardware elements of the robot such as actuators 222, meters 224, sensors 226 and tools 228 through the interface unit 204. In other embodiments, the controller 200 may include different components or not have some of the components shown as long as the desired functionality is still provided.

In general, the controller 136 controls the operation of the robot to perform several functions including, but not limited to, following a desired path as it moves along a support surface which may involve climbing objects such as walls, windows, wind turbine blades, buildings and the like, performing measurements depending on the sensors 222 that are included with the robot 10 and performing certain physical operations depending on the tools 224 that are included with the robot 10. For example, if the sensors 222 include a camera, then the controller 136 may operate the camera to obtain image data and/or video data. As another example, if the tools 224 include cleaning tools such as a spray and a wiper blade then the controller 136 may control the robot to clean a surface. The sensors 222 and tools 224 are described in more detail below.

The processor unit 202 controls the operation of the controller 200 and can be any suitable processor that can provide sufficient processing power depending on the purposes and requirements of the controller 200. For example, the processor unit 202 may include a standard processor, such as an Intel or AMD processor. Alternatively, there may be a plurality of processors that are used by the processor unit 202, and these processors may function in parallel and be dedicated to performing only certain functions. Therefore, the processor unit 202 is considered as having at least one processor.

The interface unit 204 can be any interface that allows the controller to receive data from or send control signals to other devices or hardware such as the actuators 222, the meters 224, the sensors 226 and the tools 228. In some cases, the interface unit 204 can include a serial port, a parallel port, a USB port that provides USB connectivity, another suitable communication port for sending and receiving signals or any operable combination thereof. The interface unit 204 may also include one or more Digital to Analog converters (DACs) or a multi-channel DAC when analog signals need to be sent to certain hardware. Likewise, the interface unit 204 generally also includes one or more Analog to Digital Converters (ADCs) or a multi-channel ADC when analog signals are received from hardware that must be converted to digital signals for processing by the processing unit 202 and/or storage on the memory unit 210. In cases where the sensors 226 include a camera, the interface unit 204 can include image/video processing hardware for receiving and handling image and/or video data for processing by the processing unit 202 and/or storage on the memory unit 210. In at least one embodiment, the interface unit 204 may also include other hardware that can be used for processing signals such as at least one amplifier for providing amplification of signals and at least one filter for providing filtering of signals. This may be useful for certain signals that are generated by the sensors 226 when they perform measurements.

The communication unit 206 may be a standard network adapter such as an Ethernet or 802.11x adapter or another type of adapter. Accordingly, the network unit 112 can also include at least one of an Internet connection, a Local Area Network (LAN) connection, an Ethernet connection, a FireWire connection, a modem connection, or a digital subscriber line connection. Alternatively, or in addition, the communication unit 206 may include a wireless unit. For example, the communication unit 206 may include a radio that communicates utilizing CDMA, GSM, GPRS, or Bluetooth protocol according to standards such as those in the IEEE 802.11 family (e.g., 802.11ac). The communication unit 206 can be used by the processor unit 202 to communicate with other devices or computers such as a device used by the remote operator.

The power supply unit 208 can be any suitable power source or power conversion hardware that provides power to the various components of the controller 202 as well as other electronic hardware used by the robot 10. The power supply unit 208 may be a power adaptor or a battery such as the battery 140, which may be a rechargeable battery, depending on the implementation of the controller 200 and the robot 102 as is known by those skilled in the art. In some cases, the power supply unit 208 may include a surge protector that is connected to a power source and a power converter that is connected to the surge protector (both not shown). The surge protector protects the power supply unit 208 from any voltage or current spikes in the main power line and the power converter converts the power to a lower level that is suitable for use by the various elements of the controller 200. In other embodiments, the power supply unit 208 may include other components for providing power or backup power as is known by those skilled in the art.

The memory unit 210 includes volatile storage such as RAM, and non-volatile storage such as ROM, each in the form of one or more memory chips. The non-volatile storage may be used to store software instructions, including computer-executable instructions, for implementing the operating system 212, the programs 214 and other software modules, as well as storing any data used by these software modules. The data may be stored in data files 216, which may include measurements performed by the meters 224 and/or sensors 226. The data files 216 can be used to store data that is used for the operation of the robot 10 such as threshold values, for example, as well as calibration data which may be used to perform calibration tests when the robot 10 is first being used or to perform maintenance tests on the robot 10 to make sure that it is operating correctly.

The movement module 218 includes one or more programs with software instructions that, when executed by the processor(s) of the processing unit 202, can configure the processor(s) to control the robot 10 to move in various ways as described previously as well as with respect to FIGS. 10A-10C. These motions include linear motions by moving the linear translation section 10A as well as rotational motions by rotating the rotational section 10B. This may be done when the controller 200 sends motion control signals to one or more solenoid valves 120 that are associated with one or more actuators including the double rod piston cylinder, the piston rod cylinders 56 and the rotation cylinder 104.

The function module 220 includes one or more programs with software instructions that, when executed by the processor(s) of the processing unit 202, can configure the processor(s) to control the robot to perform various functions depending on the implementation of the robot including the sensors 226 and the tools 228 that are used. The functions may include, but are not limited to, initiating movement, stopping movement, measuring values using one or more sensors 226, obtaining image data and/or video data when one of the sensors 226 is a camera, preventing the robot from moving when measured gas pressure is below the minimum gas pressure threshold, sending a signal to the remote operator when this pressure condition occurs, sending a battery charge signal to the remote operator when the battery voltage is below a battery voltage threshold value, operating a cleaning tool to perform a cleaning function when the tools 228 include the cleaning tool, performing a physical sampling operation when one of the tools 228 include a sampling instrument, or any operable combination thereof.

The actuators 222 include various components that are used during the movement of the robot 10. For example, the actuators 222 may include but are not limited to, the double rod piston cylinder, the piston rod cylinders 56, the rotation cylinder 104, rodless cylinders, magnetically coupled cylinders and rotation motors and gearboxes (may not be used where lightweight is very important), for example. The meters 224 may include, but are not limited to, the gas pressure meter 144 and the battery voltage meter 148 described herein, for example. The sensors 226 may include, but are not limited to, an image sensor, ultrasound-based sensors, lidar sensors, and pressure sensors associated with the suction cups, for example. The tools 228 may include, but are not limited to, a cleaning tool, a sanding tool, repairing tools and/or a sampling instrument, for example.

Figure 10A:
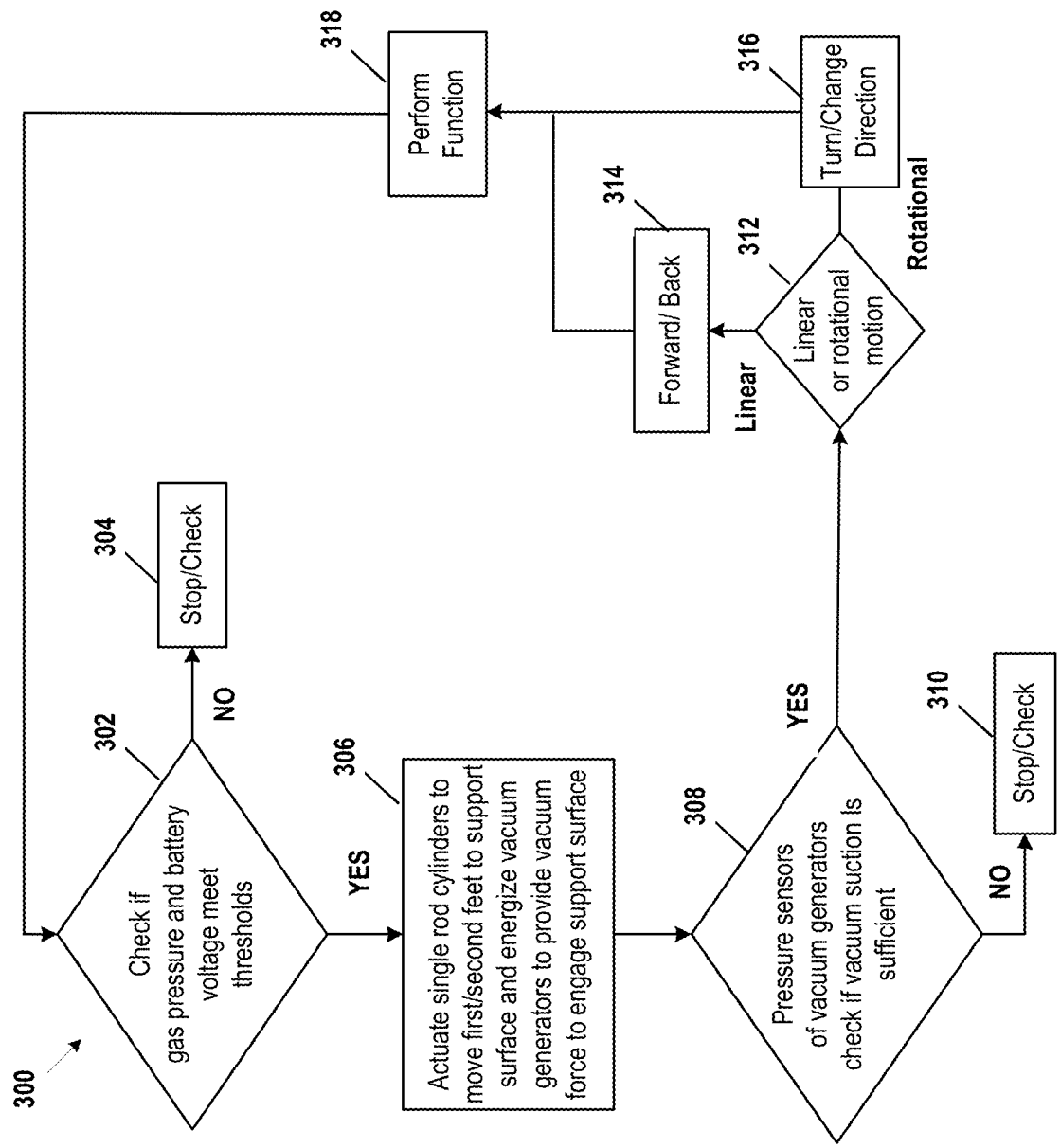
FIGS. 10A-10C show example embodiments of methods that may be used for operating one of the embodiments of the robot described herein.
Figure 10B:
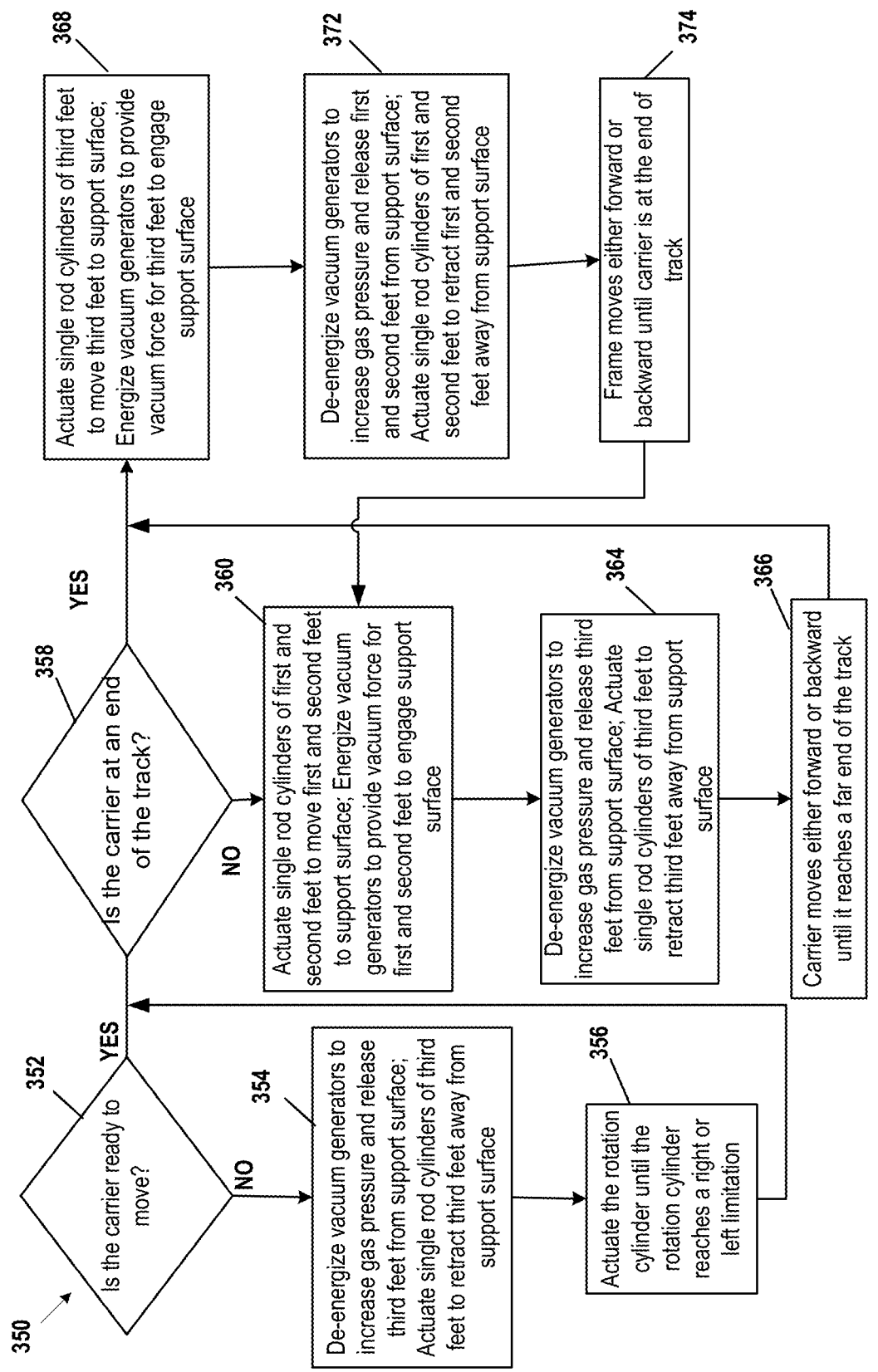
Figure 10C:
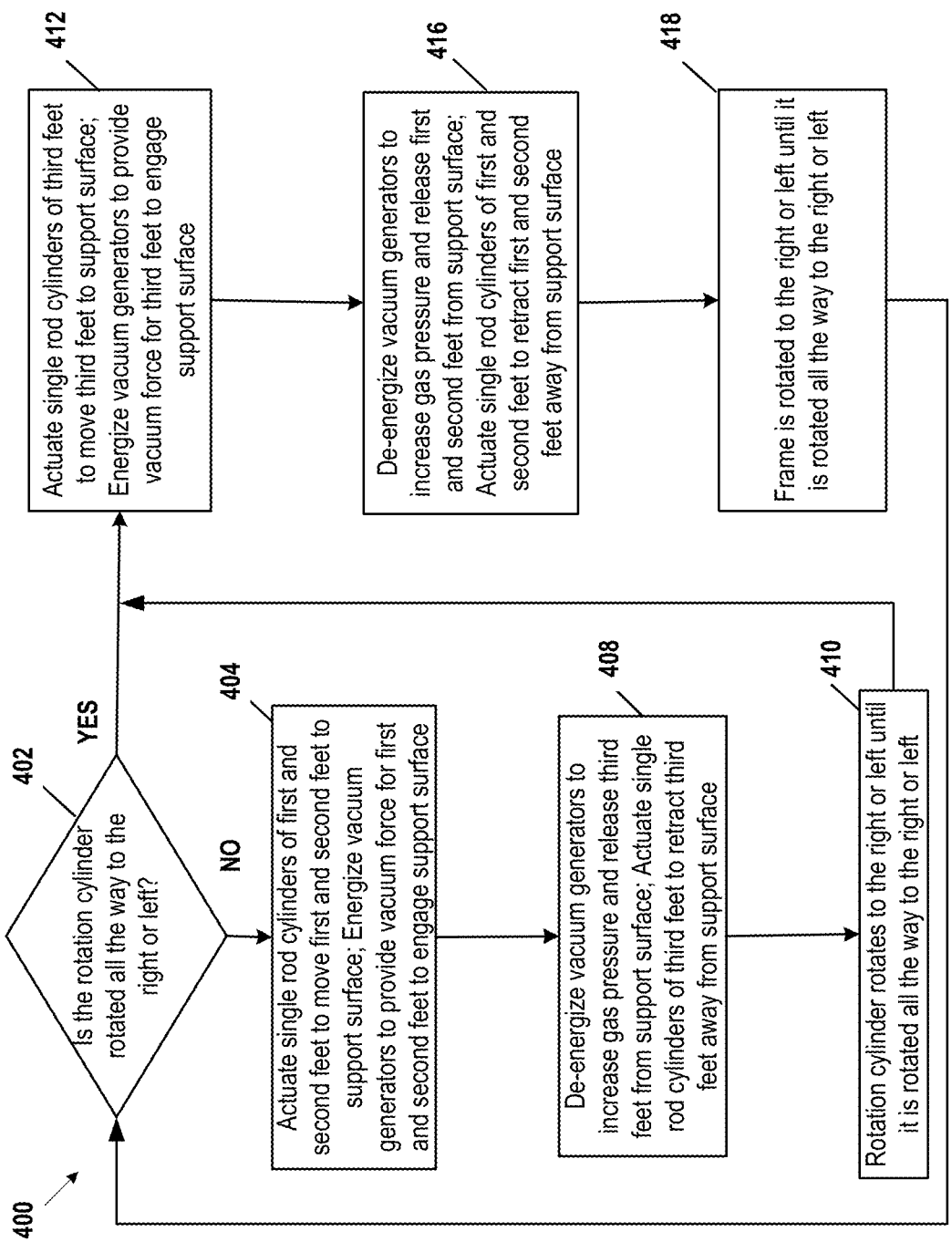

Referring now to FIGS. 10A-10C, shown therein are example embodiments of methods 300, 350 and 400 that may be used for operating one of the embodiments of the robots described herein to perform one or more locomotive functions. The methods are implemented by various hardware elements used by the robot and include the processor unit 202 as well as one or more meters 224 and one or more sensors 226. For ease of illustration, the methods 300, 350 and 400 will be described with respect to controller 200 but these methods equally apply if controller 136 is used.

Referring now to FIG. 10A, method 300 may be performed when the processor unit 202 of the controller 200 executes software instructions of the movement module 218. For example, prior to step 302, the controller 200 may activate the gas pressure meter 144 and the battery voltage meter 148 as the robot is being initialized. Then during operation, prior to performing a movement, the gas pressure meter 144 and the battery voltage meter 148 measure the gas pressure and battery voltage and compare them to the respective thresholds (as described earlier). If one of the measurements is not above its respective threshold, the method moves to step 304, where a corresponding signal is generated by one or both of the gas pressure meter 144 and the battery voltage meter 148 and received by the controller 200. The controller 200 may then stop the operation of the robot 10 when the gas pressure is low and issue a signal to receive more pressurized gas for the pneumatic control loop. Alternatively, if the measured gas pressure and measured battery voltage are above the respective thresholds, then the method 300 proceeds to step 306.

At step 306, the single rod cylinders are actuated to move the first and second feet to the support surface and the vacuum generators are energized to decrease gas pressure in the region at the bottom of the suction cup and the support surface to provide a vacuum force so that the suction cups of the first and second feet engage the support surface.

The method 300 then moves to step 308, where the pressure sensors of the vacuum generators measure the vacuum pressure for each suction cup. The vacuum generators then determine whether the vacuum pressure is sufficient to ensure that the first and second feet of the robot are attached to the support surface with sufficient pressure. This determination may be done by comparing the measured vacuum pressures to a vacuum pressure threshold. If the vacuum pressure is sufficient, the vacuum generators may send a signal to the controller 200 to indicate that the vacuum pressure is sufficient. In addition, if the vacuum pressure is above the vacuum pressure threshold, the vacuum generator may turn off to save energy. If the vacuum pressure is insufficient, the vacuum generator may automatically attempt to increase the vacuum pressure to reach the vacuum pressure threshold.

If the measured vacuum pressure for at least one of the suction cups is not sufficient, the method 300 moves to step 310 where the controller 200 halts the movement operation of the robot and performs a check. Performing a check may include returning to the robot to a previous position. If sufficient vacuum suction can be measured in the previous position (where sufficient vacuum suction was previously measured), it may be determined that debris or a defect in the area in the forward position may have inhibited sufficient vacuum suction. If this the case, the direction of forward motion may be altered to avoid the debris or defect. If sufficient vacuum suction cannot be measured in the previous position, it may be determined that there is a defect in the robot itself. Alternatively, performing a check may include moving the robot to an alternative position (i.e., a position different from (a) the current position in which sufficient vacuum pressure was not achieved; and (b) the previous position.

If the measured vacuum pressure for each suction cup is sufficient, the method 300 moves to step 312 where the controller 200 determines whether a linear or rotational motion should be performed. If the motion is linear, the method 300 moves to step 314 where the controller 200 performs several steps to move the robot in a linear fashion. This may be done by performing method 350, for example, which is shown in FIG. 10B. Alternatively, if the motion is rotational, the method 300 moves to step 316 where the controller 200 performs several steps to move the robot in a rotational fashion. This may be done by performing method 400, for example, which is shown in FIG. 10C.

After the linear or rotational motion is performed, the method 300 moves to step 318 where the controller 200 may control the robot for performing a function such as, but not limited to, performing a maintenance function, performing a cleaning function, obtaining measurement data using an image sensor or ultrasound-based sensor depending on what sensors 226 and tools 228 the robot has. After the function is performed, the method 300 moves to step 302 where the method 300 is reperformed while the robot is operational.

Referring now to FIG. 10B, shown therein is a flow chart of an example method 350 for performing a linear movement (e.g., front or back) for the robot.

At step 352, it is determined whether the carrier is ready for linear movement. For linear movement to begin, the third feet of the robot must be released from the support surface and the single rod cylinders of the third feet must be retracted. If the carrier is not ready for motion, then the method 350 moves to step 354.

At step 354, the vacuum generators are de-energized to increase gas pressure and release the third feet from the support surface. Next, the single rod cylinders of the third feet are actuated to retract the third feet away from the support surface. Once this is completed, the method 350 moves to step 356.

At step 356, the rotation cylinder is actuated until the rotation cylinder reaches a right or left limitation (i.e., the rotation cylinder is rotated completely to the right or left). Once this step is completed, or alternatively, if the carrier is ready to move at step 352, the method moves to step 358.

At step 358, it is determined whether the carrier is at an end of the track. If the robot is moving linearly forward, then it will be determined whether the carrier is at the far end of the track (i.e., the end of the track nearest the destination). If the robot is moving linearly backward, then it will be determined whether the carrier is at the near end of the track (i.e., the end of the track nearest the destination). If the carrier is not at the appropriate end of the track, then the method 350 moves to step 360.

At step 360, the single rod cylinders of the first and second feet of the robot are actuated to move the first and second feet to the support surface. Next, the vacuum generators for the first and second feet are energized to provide vacuum force for the first and second feet to engage the support surface. Once this is completed, the method 350 moves to step 364.

At step 364, the vacuum generators are de-energized to increase gas pressure and release the third feet from the support surface. Next, the single rod cylinders of the third feet are actuated to retract the third feet away from the support surface. Once this is completed, the method 350 moves to step 366.

At step 366, the carrier moves forward, if the robot is moving linearly forward, or backward, if the robot is moving linearly backward, until it reaches the corresponding end of the track. Once this is completed, or alternatively, if the carrier is at the appropriate end of the track at step 358, the method 350 moves to step 368.

At step 368, the single rod cylinders of the third feet are actuated to move the third feet to the support surface. Next, the vacuum generators of the third feet are energized to provide vacuum force for the third feet to engage the support surface. The method 350 then moves to step 372.

At step 372, the vacuum generators of the first and second feet are de-energized to increase gas pressure and release the first and second feet from the support surface. Next, the single rod cylinders of the first and second feet are actuated to retract the first and second feet away from the support surface. The method 350 then moves to step 374.

At step 374, the frame moves forward, if the robot is moving linearly forward, or backward, if the robot is moving linearly backward, until the carrier is at an end of the track. If the robot is moving forward, the frame will move forward until the carrier reaches a near end of the track (i.e., the end of the track further from the destination). If the robot is moving backward, the frame will move backward until the carrier reaches a far end of the track (i.e., the end of the track further from the destination).

Once step 374 has been completed, the method 350 may return to step 360 and continue through the remaining steps of the method.

Referring now to FIG. 10C, shown therein is a flow chart of an example method 400 for performing a rotational movement (i.e., left or right) for the robot.

At step 402, it is determined whether the rotation cylinder is rotated all the way to the right if the robot is rotating left, or left if the robot is moving right. If the rotation cylinder is not rotated completely, the method 400 moves to step 404.

At step 404, the single rod cylinders of the first and second feet are actuated to move the first and second feet of the robot to the support surface. Next, the vacuum generators of the first and second feet are energized to provide vacuum force for the first and second feet to engage the support surface. Once that is completed, the method moves to step 408.

At step 408, the vacuum generators of the third feet are de-energized to increase gas pressure and release the third feet from the support surface. Next, the single rod cylinders of the third feet are actuated to retract the third feet away from the support surface. The method then moves to step 410.

At step 410, if the robot is rotating to the right, the rotation cylinder rotates to the left until it is rotated all the way to the left. Alternatively, if the robot is rotating left, the rotation cylinder rotates to the right until it is rotated all the way to the right. Once this is completed, or alternatively, if the rotation cylinder was rotated all the way to the left or right at step 402, the method moves to step 412.

At step 412, the single rod cylinders of the third feet are actuated to move the third feet to the support surface. Next, the vacuum generators of the third feet are energized to provide vacuum force for the third feet to engage the support surface. The method then moves to step 416.

At step 416, the vacuum generators of the first and second feet are de-energized to increase gas pressure and release the first and second feet from the support surface. Next, the single rod cylinders of the first and second feet are actuated to retract the first and second feet away from the support surface. The method then moves to step 418.

At step 418, the frame is rotated. If the robot is rotating to the right, the frame is rotated to the right until it is rotated completely to the right. If the robot is rotating to the left, the frame is rotated to the left until it is rotated completely to the left. Once this is completed, the method returns to step 402 and the method 400 may be reperformed.

In the various embodiments of the robots described herein, the components and structure are selected such that the robots are light-weight. For example, in some cases, robots implemented according to the teachings herein for use with facades may weigh in the order of about 8 kg while robots implemented according to the teachings here for use with turbine blades may weigh in the order of about 9 kg.

In another aspect, in various embodiments of the robots described herein, the robots can move with multiple degrees of freedom and in any direction during use. The movement of the robots described herein is not limited by a gondola, sling or rope system. This is possible based on the unique structural design of the robot, the robot's light weight and the robot's ability to firmly adhere to surfaces with strong vacuum forces.

In another aspect, in various embodiments of the robots described herein, the robots have a very good Obstacle Overcoming Capability (OOC) which may be from about 50 mm to about 100 mm which is better than other robots' OOC. The OOC of example robots described herein is greater than that of robots known in the art because all the of the first feet 42A-42B, second feet 46A-46B, and third feet 50A-50D may be retractable/deployable. This allows robots implemented according to the teachings herein to work on façades under most conditions.

In another aspect, in various embodiments of the robots described herein, since the robots have a very light weight, it is possible to use drones with sufficient lift capability to deploy and retrieve the robot. This allows robots implemented according to the teachings herein to be quickly deployed via drones at very high locations, which provides savings in time and cost.

The various embodiments of the robots described herein may be used in various applications including, but not limited to: (a) ad-hoc turbine inspection by controlling the robots to methodically traverse an object, such as traversing the length and width of turbine blades, and use an on-board camera to capture real-time, high-fidelity images of the object surface and use a phased array ultrasonic imaging scanner to search for subsurface damage of the object; (b) scheduled maintenance so that multiple objects may be serviced sequentially reducing overall down-time (e.g., a wind plant operator may schedule maintenance so that multiple turbines are worked on sequentially rather than doing some sort of emergency action); (c) façade cleaning for various structures such as billboards and buildings where professional service organizations, such as cleaning companies, property management companies and service contractors can use the robots to maintain worker safety; and (d) cleaning of solar structures, where the robot may be used to clean solar panels for roof solar panels or other solar panel structures such that the solar cells of solar panels are not dirty and can operate more effectively.

While the applicant's teachings described herein are in conjunction with various embodiments for illustrative purposes, it is not intended that the applicant's teaching be limited to such embodiments described as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A robot comprising:
a frame having first and second frame ends, the frame extending longitudinally between the first and second frame ends;
a track having first and second track ends, the track being suspended below the frame and extending longitudinally between the first and second track ends, the first track end being positioned proximate to the first frame end and the second track end being positioned proximate the second frame end;
a carrier drivingly coupled to the track, the carrier being translatable along the track between the first and second track ends; and
at least one first foot mounted to the first frame end, at least one second foot mounted to the second frame end, and at least one third foot being rotatably mounted to the carrier so that the at least one third foot is rotatable relative to the track;
wherein at least one of the at least one first foot, the at least one second foot, and the at least one third foot is linearly displaceable so that the at least one third foot is positionable between first and second positions;
in the first position, the at least one third foot is positioned closer to the frame compared to the at least one first foot and the at least one second foot, and
in the second position, the at least one third foot is positioned farther away from the frame compared the at least one first foot and the at least one second foot.

2. The robot of claim 1, further comprising at least one support link extending between the carrier and the frame, each support link of the at least one support link rigidly coupled to the carrier and translatable along the frame.

3. The robot of claim 1, wherein the track includes a first rod of a double rod piston cylinder and a second rod of the double rod piston cylinder and the carrier is a cylinder of the double rod piston cylinder.

4. The robot of claim 3, wherein the double rod piston cylinder is configured to receive a first flow of pressurized gas in a controlled manner that causes the rods of the double rod piston cylinder to move and cause linear translation of the robot.

5. The robot of claim 4, wherein a given single rod piston cylinder is configured to receive a second flow of pressurized gas in a controlled manner for linearly displacing a corresponding foot of the at least one first foot, the at least one second foot, and the at least one third foot.

6. The robot of claim 4, further comprising a pneumatic loop having a pressurized gas junction and gas pressure circuits that are fluidically coupled to one another, the pressurized gas junction having an inlet for receiving pressurized gas from a pressurized gas supply and at least one pressurized gas outlet that is coupled to one of the gas pressure circuits and the gas pressure circuits are configured to provide one or more pressurized gas flows.

7. The robot of claim 6, wherein the pneumatic loop comprises solenoid valves for each gas pressure circuit, the solenoid valves being controlled to allow or remove the flow of pressurized gas in the gas pressure circuits.

8. The robot of claim 6, further comprising a gas pressure meter that is configured to measure gas pressure in the pneumatic loop, compare the measured gas pressure with a minimum pressure threshold value and generate a low pressure signal when the measured gas pressure is less than the minimum pressure threshold value.

9. The robot of claim 8, wherein a controller is configured to prevent the robot from performing an action that will consume gas pressure when the low pressure signal is generated.

10. The robot of claim 8, wherein the robot is coupled to a gas pressure pump and a controller, wherein the controller is configured to send a gas supply command signal to the gas pressure pump so that further gas is provided to the pneumatic loop of the robot from the gas pressure pump.

11. The robot of claim 1, wherein each of the at least one first foot, the at least one second foot, and the at least one third foot comprises a respective single rod piston cylinder for linearly displacing a corresponding foot.

12. The robot of claim 1, wherein the at least one third foot is rotatably mounted to the carrier by a rotation cylinder.

13. The robot of claim 12, wherein the rotation cylinder is configured to receive a third flow of pressurized gas in a controlled manner that causes the rotation cylinder to rotate.

14. The robot of claim 1, wherein each of the at least one first foot, the at least one second foot, and the at least one third foot include a respective suction cup that is pneumatically coupled to a respective vacuum generator for controlling a gripping force of the respective suction cup.

15. The robot of claim 14, wherein each of the respective vacuum generators is configured to receive a fourth flow of pressurized gas in a controlled manner to provide a suction force to the respective suction cup or remove the suction force from the respective suction cup.

16. The robot of claim 1, further comprising a controller for controlling motion and functionality of the robot.

17. The robot of claim 16 further comprising a battery.

18. The robot of claim 17, wherein the robot further comprises a battery voltage meter that is configured to measure battery voltage of the battery and to generate a low battery signal when the measured battery voltage is less than a battery voltage threshold value.

19. The robot of claim 18, wherein the controller is configured to send a recharging signal to a remote operator for recharging the battery when the low battery signal is generated.

20. The robot of claim 1, wherein each of the at least one first foot, the at least one second foot, and the at least one third foot comprise a respective electromagnet.

21. The robot of claim 1 further comprising at least one pneumatically actuatable clip for releasably securing the robot to a drone.

\* \* \* \* \*